US006985483B2

(12) United States Patent
Mehrotra et al.

(10) Patent No.: US 6,985,483 B2
(45) Date of Patent: Jan. 10, 2006

(54) METHODS AND SYSTEMS FOR FAST PACKET FORWARDING

(75) Inventors: Pronita Mehrotra, Raleigh, NC (US); Paul D. Franzon, Holly Springs, NC (US)

(73) Assignee: North Carolina State University, Raleigh, NC (US)

( * ) Notice: Subject to any disclaimer, the term of this patent is extended or adjusted under 35 U.S.C. 154(b) by 917 days.

(21) Appl. No.: 09/981,858

(22) Filed: Oct. 18, 2001

(65) Prior Publication Data

US 2003/0091043 A1 May 15, 2003

Related U.S. Application Data

(60) Provisional application No. 60/308,941, filed on Jul. 31, 2001.

(51) Int. Cl.
G06F 12/00 (2006.01)

(52) U.S. Cl. .................... 370/389; 370/400; 707/3; 709/238

(58) Field of Classification Search ............... 370/389, 370/392, 393, 400; 707/3; 709/238
See application file for complete search history.

(56) References Cited

U.S. PATENT DOCUMENTS

| 5,491,694 | A | | 2/1996 | Oliver et al. | |
|---|---|---|---|---|---|
| 5,566,170 | A | | 10/1996 | Bakke et al. | |
| 5,598,410 | A | | 1/1997 | Stone | |
| 5,787,430 | A | | 7/1998 | Doeringer et al. | |
| 5,790,546 | A | | 8/1998 | Dobbins et al. | |
| 5,909,440 | A | | 6/1999 | Ferguson et al. | |
| 5,917,820 | A | * | 6/1999 | Rekhter | 370/392 |
| 5,920,886 | A | | 7/1999 | Feldmeier | |
| 5,983,223 | A | * | 11/1999 | Perlman | 707/6 |
| 5,991,299 | A | | 11/1999 | Radogna et al. | |
| 6,011,795 | A | | 1/2000 | Varghese et al. | |
| 6,014,659 | A | * | 1/2000 | Wilkinson et al. | 707/3 |
| 6,018,524 | A | | 1/2000 | Turner et al. | |
| 6,052,683 | A | | 4/2000 | Irwin | |
| 6,058,431 | A | | 5/2000 | Srisuresh et al. | |
| 6,081,440 | A | | 6/2000 | Washburn et al. | |
| 6,119,171 | A | | 9/2000 | Alkhatib | |
| 6,128,664 | A | | 10/2000 | Yanagidate et al. | |
| 6,141,738 | A | | 10/2000 | Munter et al. | |
| 6,147,976 | A | | 11/2000 | Shand et al. | |
| 6,154,446 | A | | 11/2000 | Kadambi et al. | |
| 6,157,955 | A | | 12/2000 | Narad et al. | |
| 6,173,384 | B1 | | 1/2001 | Weaver | |
| 6,181,698 | B1 | | 1/2001 | Hariguchi | |
| 6,192,051 | B1 | | 2/2001 | Lipman et al. | |

(Continued)

OTHER PUBLICATIONS

Lampson et al., "IP Lookups Using Multiway and Multi-column Search," IEEE, p. 1248-1256, (1998).

(Continued)

*Primary Examiner*—Min Jung
(74) *Attorney, Agent, or Firm*—Jenkins, Wilson & Taylor, P.A.

(57) ABSTRACT

Methods and systems for fast packet forwarding include traversing a trie data structure stored in on-chip memory based on bits in an input address. The bits in the input address result in a predetermined location in the data structure. The number of bits that have a first value and that are located before the determined location is calculated. The calculated number of bits corresponds to an offset in a second memory device of an address to which the packet having the input address is to be forwarded. The address can be extracted using a single access to an off-chip memory device.

20 Claims, 20 Drawing Sheets

U.S. PATENT DOCUMENTS

| | | | |
|---|---|---|---|
| 6,212,183 | B1 | 4/2001 | Wilford |
| 6,212,184 | B1 | 4/2001 | Venkatachary et al. |
| 6,216,168 | B1 | 4/2001 | Dev et al. |
| 6,223,172 | B1 | 4/2001 | Hunter et al. |
| 6,237,061 | B1 | 5/2001 | Srinivasan et al. |
| 6,243,720 | B1 | 6/2001 | Munter et al. |
| 6,396,842 | B1 * | 5/2002 | Rochberger ............... 370/408 |
| 6,522,632 | B1 * | 2/2003 | Waters et al. .............. 370/254 |
| 6,571,313 | B1 * | 5/2003 | Filippi et al. .............. 711/108 |
| 6,697,363 | B1 * | 2/2004 | Carr ........................... 370/389 |
| 6,711,661 | B1 * | 3/2004 | Zabarski et al. ............ 711/202 |
| 6,877,005 | B2 * | 4/2005 | Hunter et al. ................. 707/10 |

OTHER PUBLICATIONS

Waldvogel et al., "Scalable High Speed IP Routing Lookups," ACM, p. 25-36, (1997).

Degermark et al., "Small Forwarding Tables for Fast Routing Lookups," ACM, p. 3-14, (1997).

Michigan University and Merit Network, "Internet Performance Measurement and Analysis Project," http://nic.merit.edu/ipma, p. 1-17, (2002).

Nick McKeown, "How Scalable is the Capacity of (Electronic) IP Routers," Optical Fiber Communication Conference, p. 1-36, (Mar. 2001).

Chiueh et al., "Cache Memory Design for Networking Processors," Proceedings of Sixth International Symposium on High-Performance Computer Architecture, p. 1-10, (2000).

Yazdani et al., "Fast Scalable Schemes for the IP Address Lookup Problem," Proc. IEEE Conference on High Performance Switching and Routing, p. 83-92, (2000).

Wei et al., "Just-In-Time Signaling for WDM Optical Burst Switching Networks," Journal of Lightwave Technology, vol. 18 (No. 12), p. 2019-2037, (Dec. 2000).

Listanti et al., "Architectural and Technological Issues for Future Optical Internet Networks," IEEE Communications Magazine, p. 82-92, (Sep. 2000).

Chiueh et al., "High-Performance IP Routing Table Lookup Using CPU Caching," Proc. IEEE INFO-COM '99, p. 1421-1428, (1999).

McKeown et al., "High Performance Switches and Routers: Theory and Practice," Hot Interconnects Tutorial Slides, http://tiny-tera.standford.edu/nickm/talks/index.html, p. 1-126, (1999).

Nilsson et al., "IP-Address Lookup Using LC-Tries," IEEE Journal on Selected Areas in Communications, vol. 17 (No. 6), p. 1083-1092, (Jun. 1999).

Huang et al., "A Novel IP-Routing Lookup Scheme and Hardware Architecture for Multigigabit Switching Routers," IEEE Journal on Selected Areas in Communications, vol. 17 (No. 6), p. 1093-1104, (Jun. 1999).

Gupta et al., "Routing Lookups in Hardware at Memory Access Speeds," Proc. IEEE INFOCOM'98, p. 1240-1247, (1998).

J.M. Rabney, "Digital Integrated Circuits, A Design Perspective," Prentice Hall, Ch. 8, p. 446-454, (1996).

Keith Sklower, "A Tree-Based Packet Routing Table for Berkeley Unix," Technical Report, p. 1-14.

* cited by examiner

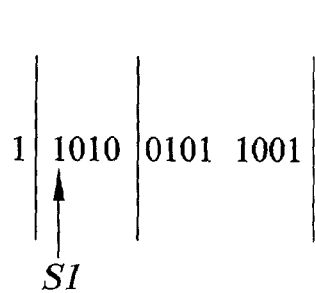
FIG. 16
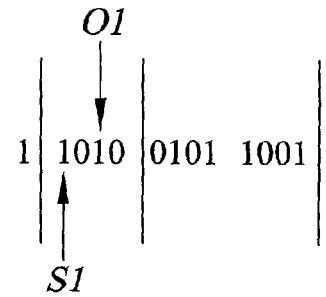
FIG. 17
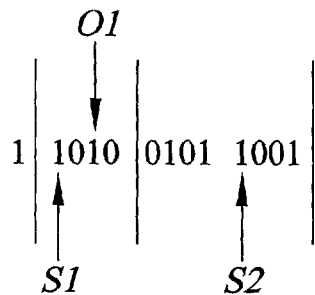
FIG. 18
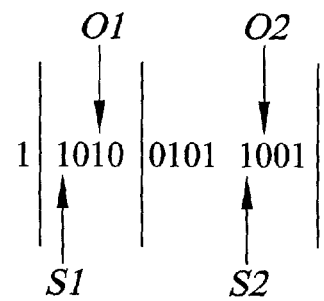
FIG. 19
| Sum | Bit Pattern | |
|---|---|---|
| 0x0000 | 0x2980 | Level 0 |
| 0x0000 | 0x0000 0x0000 0x8000 0x0008 | Level 1 |
| 0x0000 | 0x1000 0x8000 | Level 2 |
| 0x0000 | 0x0000 0x0000 | Level 3 |
FIG. 20

METHODS AND SYSTEMS FOR FAST PACKET FORWARDING

RELATED APPLICATIONS

This application claims the benefit of U.S. Provisional Patent Application Ser. No. 60/308,941 filed Jul. 31, 2001, the disclosure of which is incorporated herein by reference in its entirety.

GRANT STATEMENT

This work was supported by grant number 10093.002 from the National Security Agency (NSA). Thus, the United States Government has certain rights in the invention.

TECHNICAL FIELD

The present invention relates to methods and systems for fast packet forwarding. More particularly, the present invention relates to methods and systems for fast packet forwarding wherein a location obtained in a data structure based on bits in an input address is used to determine the interface corresponding to the next node to which a packet is to be forwarded.

BACKGROUND ART

Internet traffic increases by a factor of 10 every year while the number of hosts on the Internet increase by a factor of 3 every 2 years. This means that in order to maintain the same performance levels, packets now need to be forwarded faster despite there being a larger forwarding database. Larger databases increase the number of memory accesses required to determine the address of the next node to which a packet is to be forwarded. Such an address is commonly referred to as a next hop address.

In order to meet the demands of high-speed routing, such as gigabit or terabit routing, it is desirable that address lookups be performed in hardware. Currently, the fastest software approaches still take hundreds of nanoseconds on average in order to perform address lookups, which is unsuitable for such high-speed forwarding. One problem with performing address lookups in hardware is that larger forwarding tables will not fit in the memory of the chip that performs the address lookup. One problem with performing address lookups in hardware is that large amounts of memory are required to store the required tables. Thus, the table is stored in large, slow, usually off-chip memories. In addition, address lookups require multiple accesses to the table. Access to the full table, generally stored in a large slow, usually off-chip, memory, greatly increases the time for performing an address lookup. Thus, the number of slow, full table accesses should be reduced in a fast address lookup scheme.

Another important factor in fast address lookups is the need for a constant address lookup time. Having a constant address lookup time is especially important for emerging applications, such as optical burst switching (OBS). In optical burst switched networks, the signaling is performed out of band. Only the signaling channel goes through optical/electrical/optical (O/E/O) conversion. The signaling message is sent before the data burst and is interpreted at each of the nodes along the path. In response to the signaling message, the nodes establish a path for the data burst before the data burst arrives. The data burst is sent after a predetermined delay without receiving confirmation from the network nodes regarding the available path. The delay is dependent of the number of nodes along the path. If the setup time at each node is variable, the delay is unpredictable and leads to an inefficient network. Accordingly, it is desirable that the mechanism used to perform the network address lookup achieve a fast, constant lookup time.

The lookup to determine the next hop address of a packet is the most time critical part in packet forwarding. The problem of searching in large databases is compounded by the fact that routing tables store variable length prefixes and their corresponding next hop addresses. In order to forward a packet, routers need to find the longest prefix in the routing table that matches the destination address in a packet to be forwarded. Table 1 shown below illustrates an exemplary routing table.

TABLE 1

Sample Routing Table with Prefixes and Next Hops

| Prefix | Next Hop |
| --- | --- |
| 0010* | 2 |
| 10* | 9 |
| 01* | 3 |
| 0111* | 5 |
| 1011* | 1 |
| 011101* | 1 |
| 11001* | 6 |

In Table 1, the entries of the left hand side are network address prefixes to be compared with bits in a destination address field of a packet to be forwarded. In Table 1, the "*" character represents a wildcard. The right hand column in table 1 represents an identifier corresponding to the node or network interface to which the packet is to be forwarded. For example, most routers have several network interfaces, one interface corresponding to each node to which the router is directly connected. The identifiers in the next hop column of Table 1 may correspond to these interfaces.

If a router using Table 1 as its routing table receives a packet having a destination network address in which the first 8 bits are 01110101, multiple prefixes in Table 1 match this address. For example, the addresses 01*, 0111*, and 011101* match the destination address. Of these matching addresses, the longest match is the entry with the prefix 011101*. The identifier corresponding to the next hop address is 1.

A number of approaches have been developed to search for longest matching prefixes. Most approaches fall under the categories of either search tries or search trees. In conventional search tries, each bit in the address of a received packet is used to determine a path through the trie. A '0' points to the left half of a sub-tree within the trie and a '1' points to the right half of a sub tree within the trie. The lookup proceeds by traversing the trie until a leaf node is located. The trie data structure includes nodes that store pointers to child nodes. All leaves and some internal nodes contain next hop information. Some implementations require only leaves to store next hop information in which case the internal nodes store only pointers to child nodes. In most conventional implementations, the entire trie structure that includes the next hop addresses is stored in one memory. In tree-based lookups, the value of the destination address in a packet to be forwarded is compared with the median value of each sub-tree in the tree data structure. If the value is less than the median value, the search proceeds to the left half of the sub-tree. If the value is greater than the median value, the search proceeds to the right half of the sub-tree. Again, the entire data structure is stored in one memory only and the search leads to an entry that also stores the next hop entry.

One problem with both trie-based address lookups and tree-based address lookups is the fact that conventional approaches store pointers to the child nodes at all internal nodes. Storing pointers at the nodes increases the size of the data structure. As routing tables become larger, such data structures will not fit entirely in on-chip memories. As a result, off-chip memory accesses are required. Because multiple off-chip memory accesses are required, the goals of fast and constant network address lookups cannot be achieved. Accordingly, there exists a need for methods and systems for fast address lookups that avoid the difficulties associated with conventional tree-based and trie-based lookup schemes.

DISCLOSURE OF THE INVENTION

According to one aspect, the present invention includes a method for determining an output port corresponding to the next node to which a packet is to be directed in a computer network. The method includes constructing a data structure based on variable-length network address prefixes. The data structure is stored in a memory device. A set of output port identifiers corresponding to the network address prefixes is stored in another memory device. The data structure is traversed based on bits in an input address to determine a location corresponding to the longest network address prefix that matches the input address. The location in the data structure is used to determine an offset in the second memory device for the output port identifier corresponding to the input address.

Because the longest matching prefix can be determined based on the location obtained in the data structure, there is no requirement that pointers be stored at nodes in the data structure. As a result, the size of the data structure and consequently the memory requirements are reduced. The data structure will thus fit in an on-chip memory, which reduces lookup time.

Accordingly, it is an object of the invention to provide methods and systems for fast address lookups that avoid the difficulties of conventional algorithms that require storing pointers at the internal nodes.

It is yet another object of the invention to provide methods and systems for fast network address lookups that calculate an offset for locating a next hop address based on a location in a forwarding table data structure obtained based on an input address.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which:

FIG. 16 is a bit pattern illustrating the position of the start pointer when performing a network address lookup after one step of a lookup algorithm according to an embodiment of the present invention;

FIG. 17 is a bit pattern illustrating the position of the start pointer and the offset in performing a network address lookup according to an embodiment of the present invention;

FIG. 18 is a bit pattern illustrating the positions of the start pointer, the offset, and the new position of the start pointer in performing a network address lookup according to an embodiment of the present invention;

FIG. 19 is a bit pattern illustrating the positions of the start pointer, the offset, the new position of the start pointer, and the new position of the offset in per forming a network address lookup according to an embodiment of the present invention;

FIG. 20 is a memory diagram illustrating the data structure in FIG. 12 stored in hexadecimal format according to an embodiment of the present invention;

DETAILED DESCRIPTION OF THE INVENTION

Figure 1:
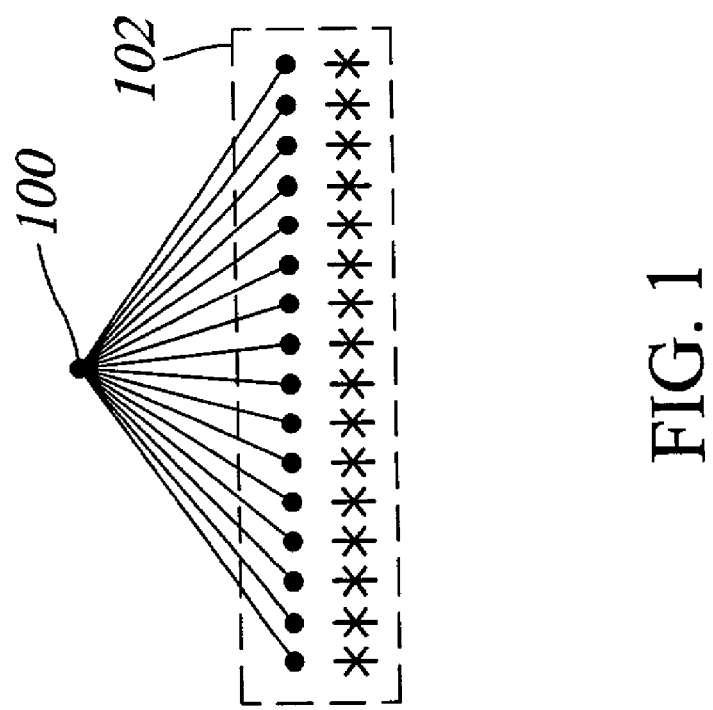
FIG. 1 is a trie data structure diagram in which leaf nodes point to default next hop addresses.

Preferred embodiments of the invention will now be explained with reference to the accompanying drawings. First, an exemplary method for constructing a data structure suitable for fast network address lookups and that does not require pointer storage at internal nodes will be described. Next, a method for performing fast network address lookups using the data structure will be described. Finally, a discussion of exemplary hardware on which the invention may be implemented will be described.

Building a Fast Network Address Lookup Data Structure

According to one aspect, the present invention includes a method for storing a forwarding table data structure in on-chip memory. Such a method does not require the storage of pointers at the internal nodes. As a result, the data structure can be smaller and will be more likely to fit in an on-chip memory. In one embodiment, the data structure is a trie data structure. An example constructing a trie data structure based on a set of network address prefixes. Table 2 shown below illustrates exemplary address prefixes and identifiers corresponding to next hop addresses. The prefixes in Table 2 may correspond to IP addresses. For example, the prefix 10* in the first entry of Table 2 may correspond to an IP address of 128.0.0.0. However, the present invention is not limited to IP addresses. The methods and systems described herein may be used for fast packet forwarding in any scheme in which address lookups are performed based on variable-length prefixes. Examples of applications of the present invention include IP forwarding and optical burst switching.

TABLE 2

Database of Prefixes and Their Associated Next Hops

| Prefix | Next Hop |
|---|---|
| 10* | 3 |
| 1000* | 6 |
| 1000 1100* | 3 |
| 1000 1100 0000 1100* | 2 |
| 01* | 7 |
| 0100 0000* | 12 |
| 0010 0110* | 5 |
| 0111* | 9 |
| 0111 0000 0011 00* | 5 |
| 0101* | 2 |

In order to build a trie data structure, the prefixes are preferably sorted in ascending order. A prefix of shorter length is considered smaller if two prefixes have the same value. For example, the prefix 10* would be considered smaller than 100*. Table 3 shown below illustrates the prefixes in Table 2 after sorting in ascending order.

TABLE 3

Prefixes Sorted in Ascending Order

| Prefix | Next Hop |
|---|---|
| 0010 0110* | 5 |
| 01* | 7 |
| 0100 0000* | 12 |
| 0101* | 2 |
| 0111* | 9 |
| 0111 0000 0011 00* | 5 |
| 10* | 3 |
| 1000* | 6 |
| 1000 1100* | 3 |
| 1000 1100 0000 1100* | 2 |

Once the prefixes are sorted, the next step is to start building the trie data structure. In building the trie data structure, trie completion is performed where it is necessary to ensure that only leaves represent valid prefixes. In the figures described hereinbelow, the digits beside each leaf in the trie data structures represent the next hop addresses. These addresses are shown in the figures for illustration purposes only. A trie data structure according to the present invention does not require that the next hop addresses or pointers to next hop addresses be stored at the leaf nodes. It is a feature of the invention that only a single bit may be stored in memory for each node.

FIG. 1 illustrates a trie data structure at initialization. In FIG. 1, the trie data structure includes a root node 100 and a plurality of leaf nodes 102. In the illustrated example, there are 16 leaf nodes because a 16-way trie has been used in the implementation described herein. The leaf nodes are referred to as children of root node 100 because they are directly connected to root node 100 without crossing another node. Each leaf node 102 is initialized to point to the default next hop address, represented by an asterisk.

Figure 2:
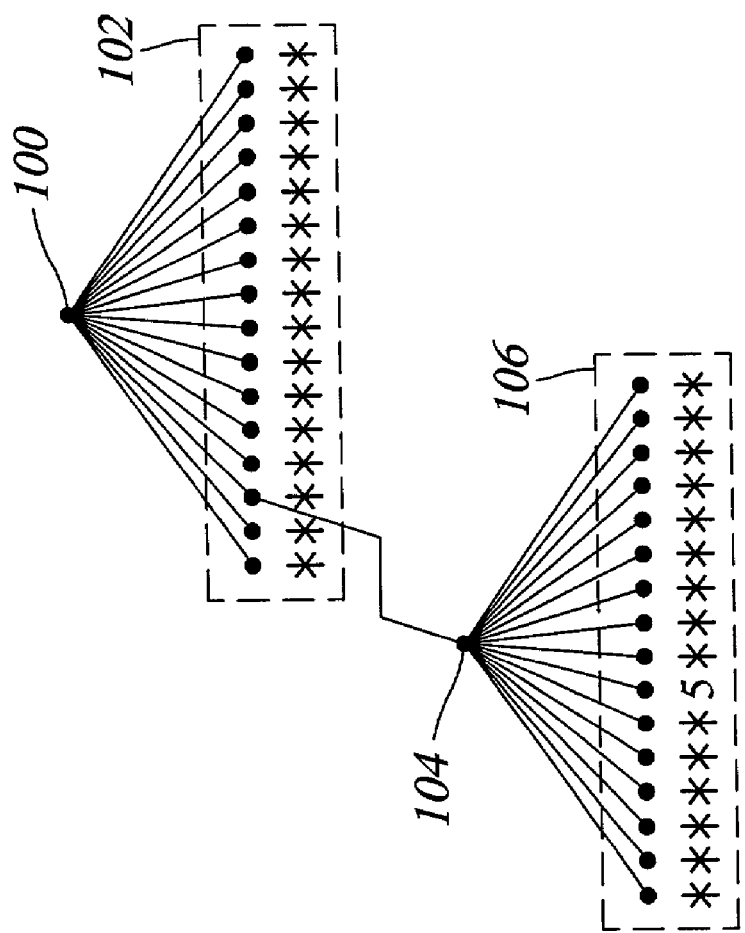
FIG. 2 is a trie data structure diagram in which a next hop address has been added to the trie data structure illustrated in FIG. 1.

Once root node 100 is initialized, each entry from the sorted list in Table 3 is added to the trie. The first entry in Table 3 is 00100110*. FIG. 2 illustrates the trie data structure after adding this entry. The first 4 bits of the prefix (0010) point to bit 2 of root node 100. In FIG. 2, bit 2 of root node 102 is represented by the third child node 102 from the left. Since the prefix is longer than 4 bits, an additional node 104 is added to the third child of root node 100. Leaf nodes 106, which are children of node 104, inherit the next hop entries of their parent (root node 100). The next 4 bits of the prefix (0110) point to child 6 of newly added node 104. From Table 3, the next hop address corresponding to the entry is 5. As a result, the next hop address corresponding to the sixth child of node 104 is changed to 5.

Figure 3:
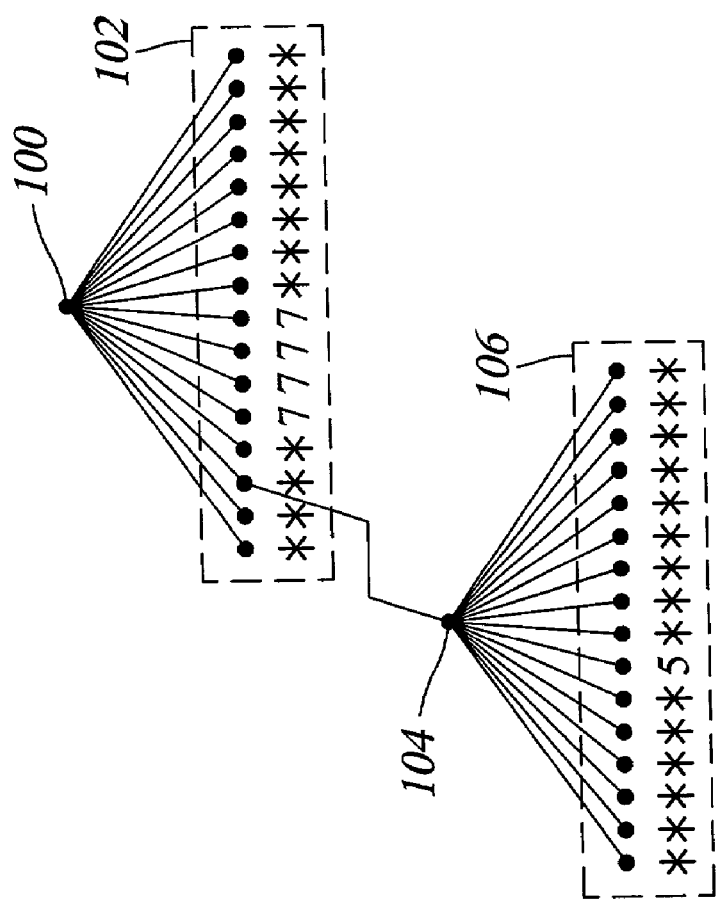
FIG. 3 is a trie data structure diagram in which a next hop address has been added to the trie data structure illustrated in FIG. 2.

The next entry in the table to be added to the data structure is 01* with a next hop of 7. FIG. 3 illustrates the result of adding this entry to the trie data structure. Children of root node 100 that fall within the range of prefixes represented by 01* are 0100, 0101, 0110, and 0111. Accordingly, the next hop addresses is associated with the fourth, fifth, sixth, and seventh children of root node 100 are changed from the default route to 7.

Figure 4:
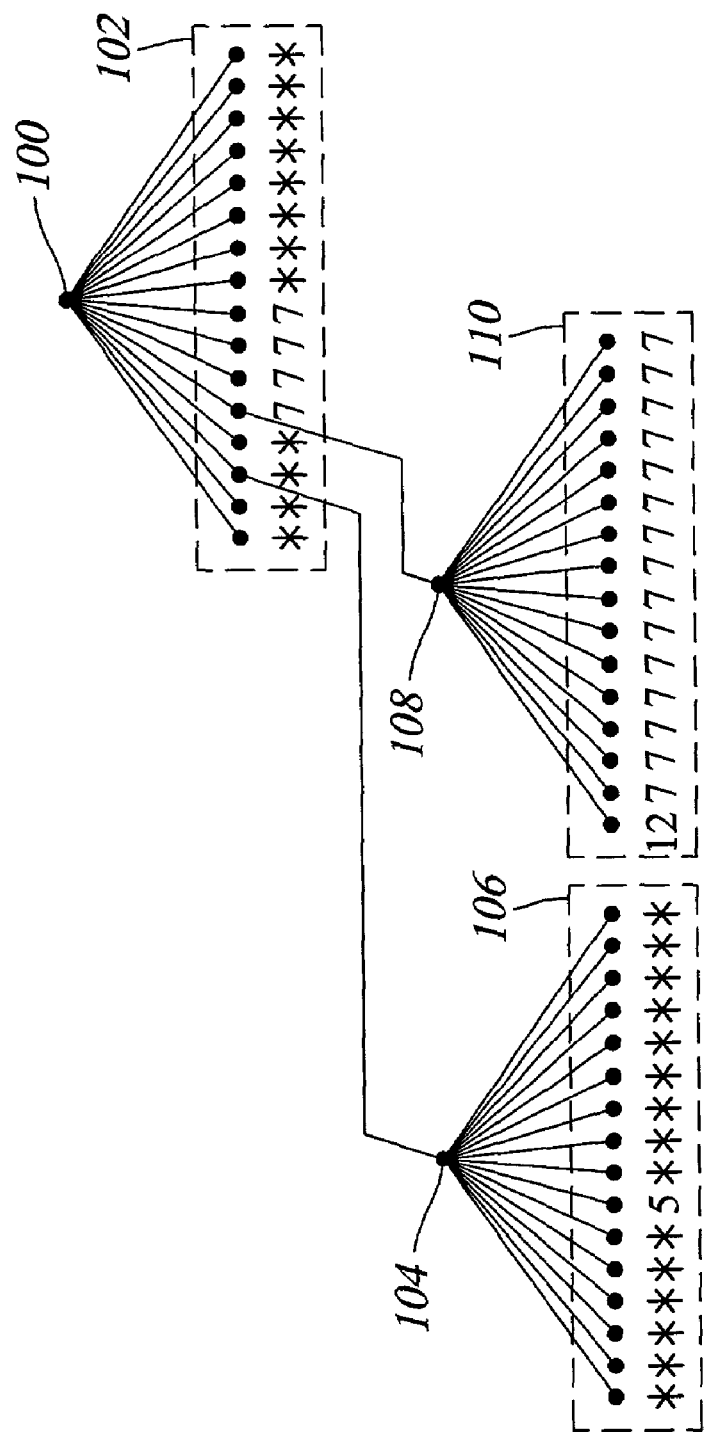
FIG. 4 is a trie data structure diagram in which a next hop address has been added to the trie data structure illustrated in FIG. 3.

The next entry in Table 3 to be added to the data structure is 01000000*. The next hop address corresponding to this entry is 12. FIG. 4 illustrates the data structure after addition of this entry. In FIG. 4, a new node 108 is added to the fourth child of root node 100, corresponding to the first four bits (0100) of the entry. Children of node 108 inherit the next hop address of 7 from the parent of node 108. The next 4 digits of the entry (0000) correspond to the $0^{th}$ child of node 108. Accordingly, the next hop address of the $0^{th}$ child is changed from seven to 12.

Figure 5:
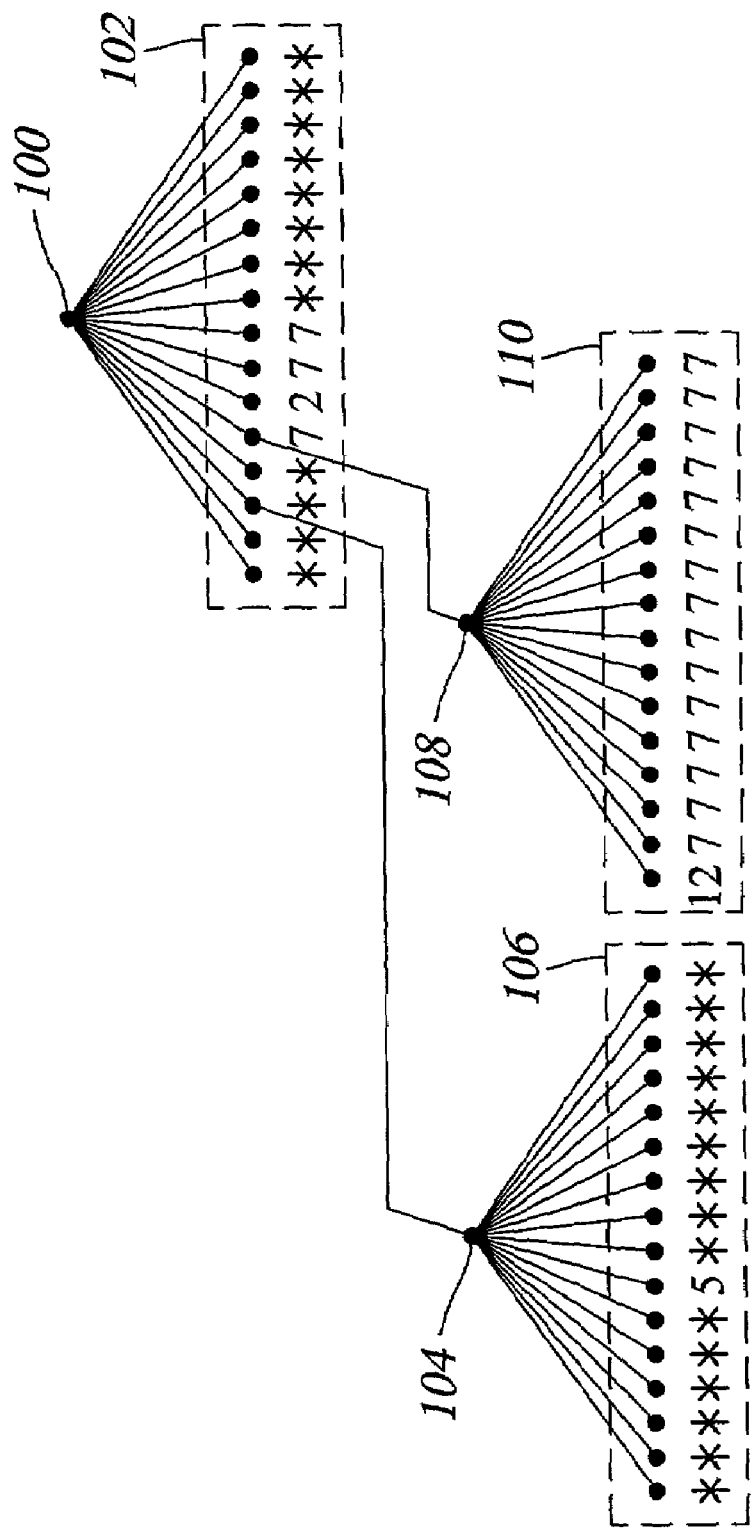
FIG. 5 is a trie data structure diagram in which a next hop address has been added to the trie data structure illustrated in FIG. 4.

The next entry from Table 3 to be added to the data structure is 0101* with a next hop address of 2. FIG. 5 illustrates the data structure after adding this entry. In FIG. 5, the next hop address of the fifth child of the root node 100 is changed from 7 to 2.

Figure 6:
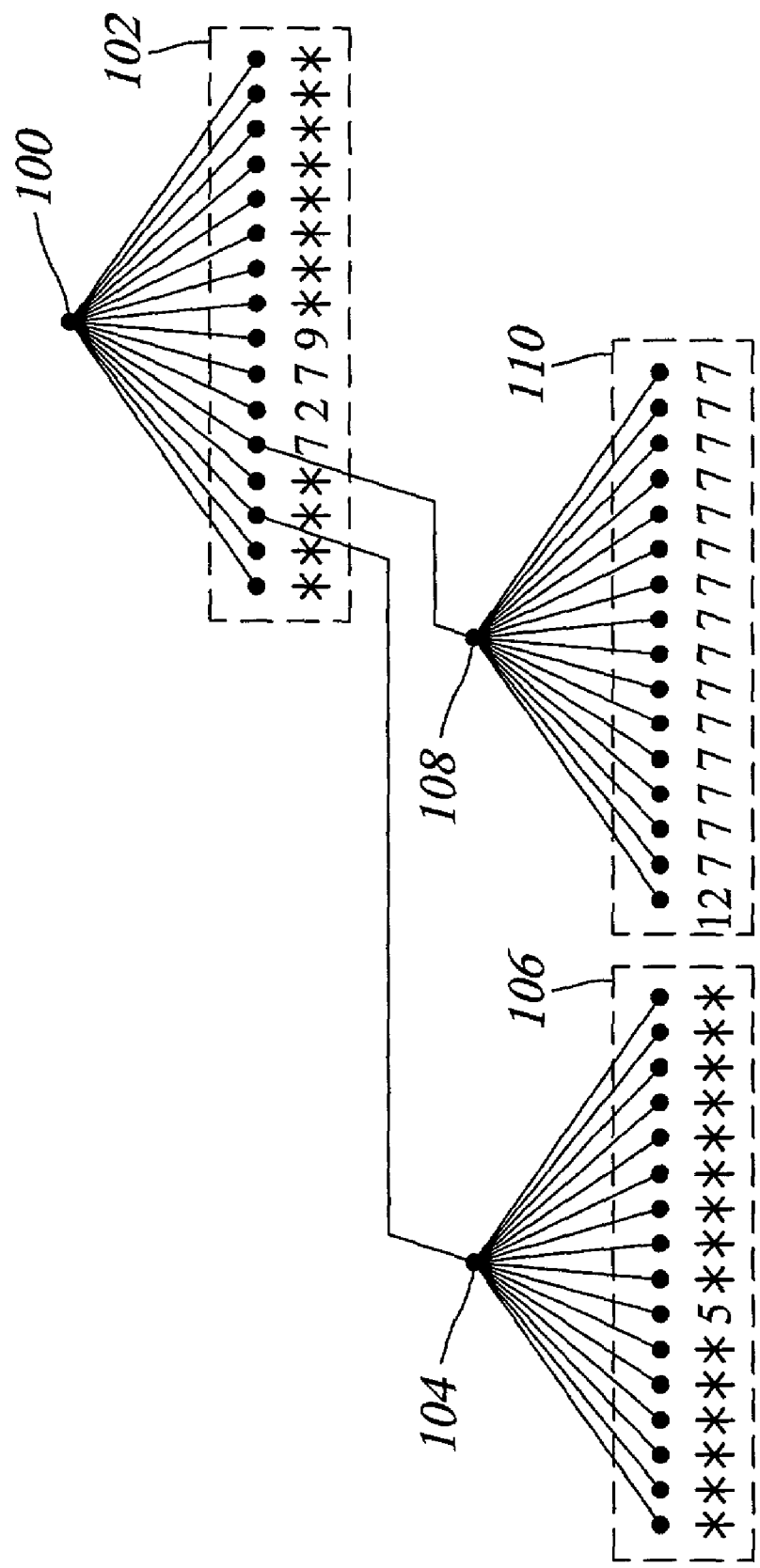
FIG. 6 is a trie data structure diagram in which a next hop address has been added to the trie data structure illustrated in FIG. 5.

The next prefix to be added to the data structure from Table 3 is 0111* with a next hop of 9. FIG. 6 illustrates the result of adding this entry to the data structure. In FIG. 6, the next hop address of the seventh child of root node 100 is changed from 7 to 9.

Figure 7:
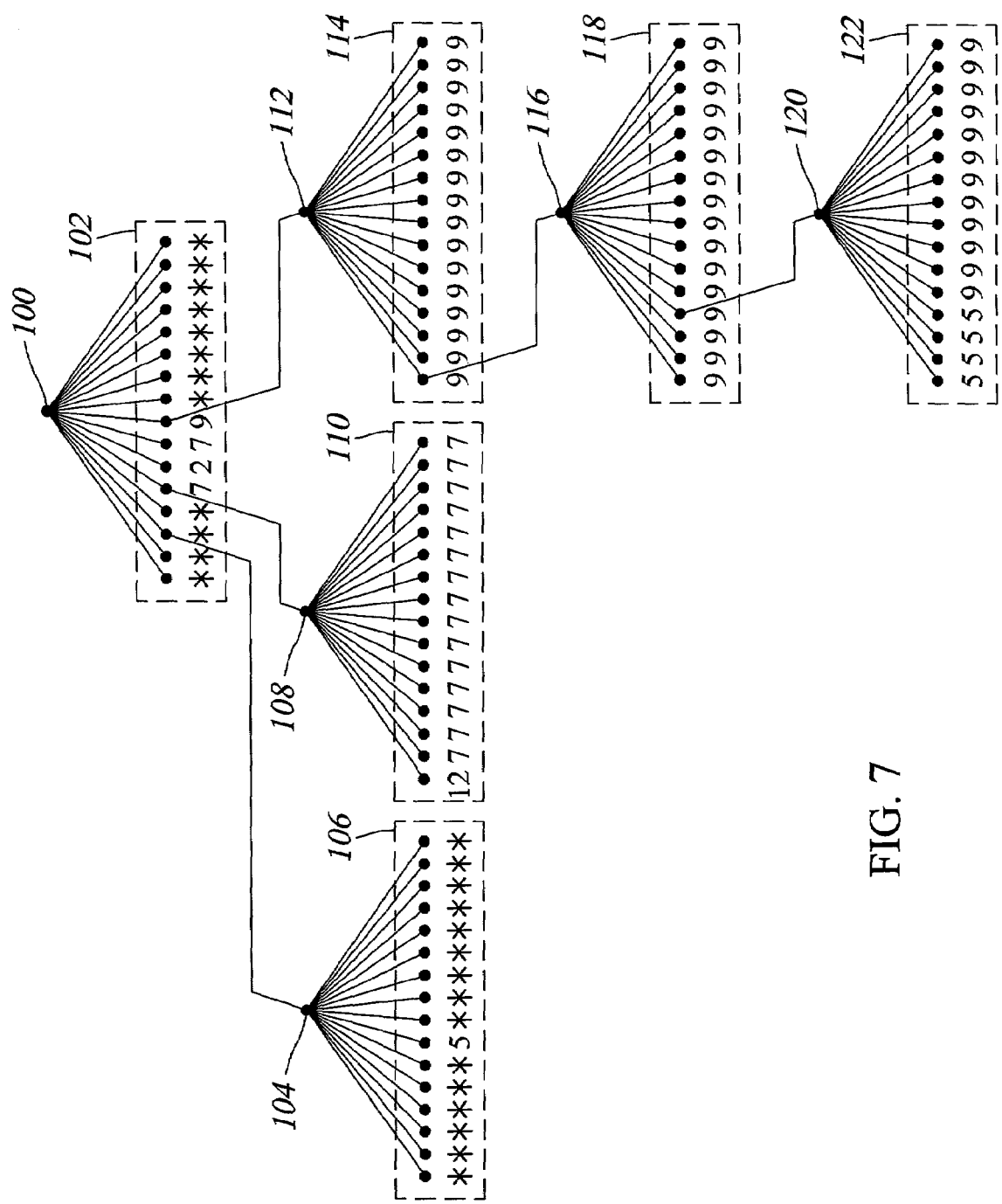
FIG. 7 is a trie data structure diagram in which a next hop address has been added to the trie data structure illustrated in FIG. 6.

The next entry from Table 3 to be added to the data structure is 01110000001100*. The next hop address associated with this entry is 5. FIG. 7 illustrates the data structure after adding this entry. In FIG. 7, the first 4 bits of the entry (0111) result in the addition of node 112 to the data structure. Children 114 of node 112 inherit the next hop address of 9 from the parent of node 112. The next 4 bits of the entry (0000) result in the addition of node 116 to the data structure. Children 118 of node 116 inherit the next hop address of 9 from the parent of node 116. The next 4 bits in the data structure (0011) result in the addition of node 120 to the data structure. Children 122 of node 120 inherit the next hop address of 9 from the parent of node 120. Finally, the last 2 bits of the entry (00*) result in the next hop addresses of the children 0000, 0001, 0010, and 0011 of node 120 being changed from 9 to 5.

Figure 8:
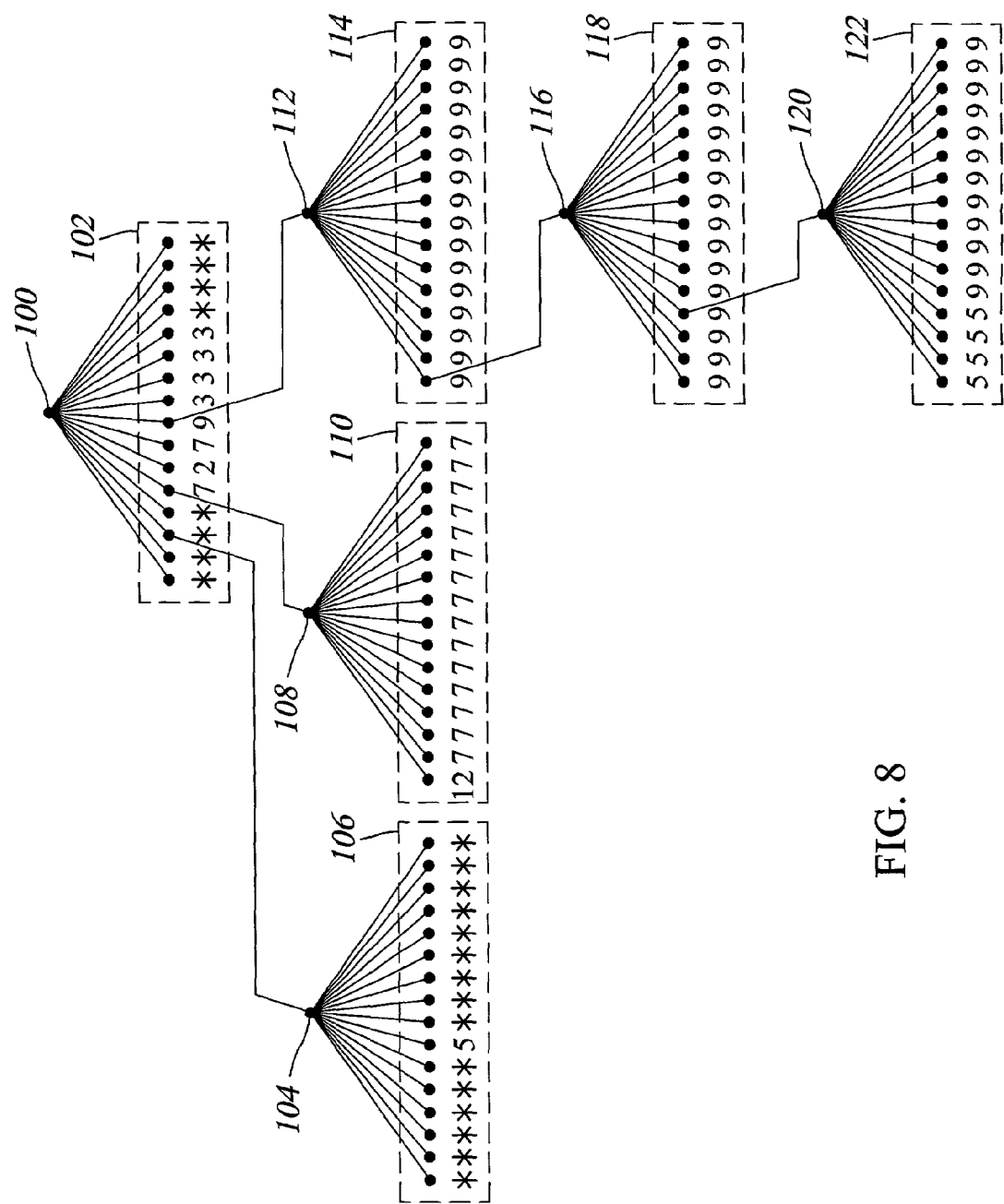
FIG. 8 is a trie data structure diagram in which a next hop address has been added to the trie data structure illustrated in FIG. 7.

The next entry from Table 3 to be added to the data structure is 10* with a next hop of three. FIG. 8 illustrates the data structure after adding this entry. This entry results only in changes to children of leaf node 100. In particular, the next hop addresses associated with children 1000, 1001, 1010, and 1011 are changed from a default value (*) to 3.

Figure 9:
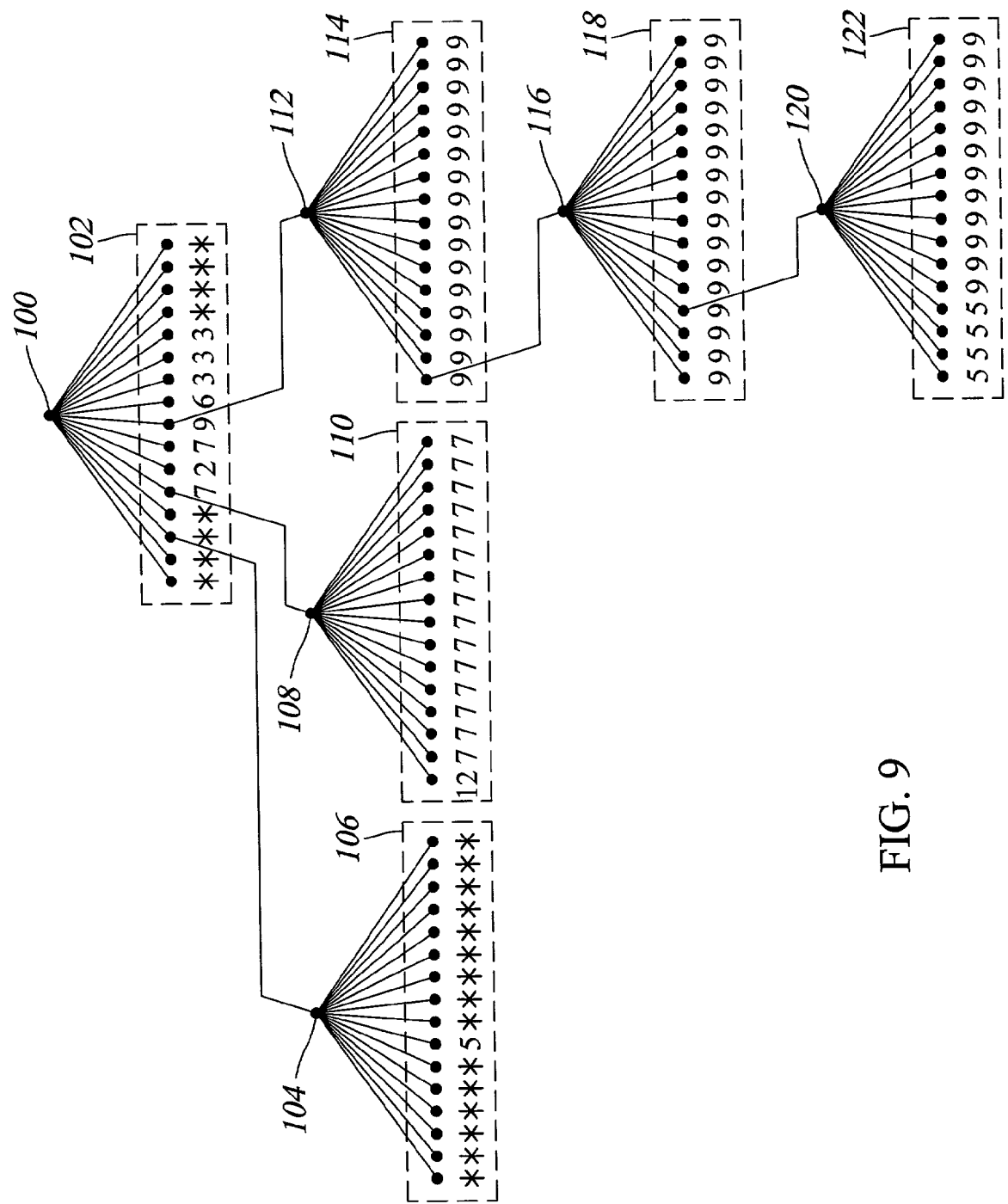
FIG. 9 is a trie data structure diagram in which a next hop address has been added to the trie data structure illustrated in FIG. 8.

The next entry from Table 3 to be added to the data structure is 1000*. The next hop address associated with this entry is six. FIG. 9 illustrates the data structure after adding this entry. From FIG. 9, it can be seen that this entry results only in the updating of next hop address associated with the eighth child of root node 100. This also illustrates the importance of putting 10* before 1000* in the sorting. If the reverse had been done, the next hops of children 102 of root node 100 would have been incorrectly set to **72793333**.

Figure 10:
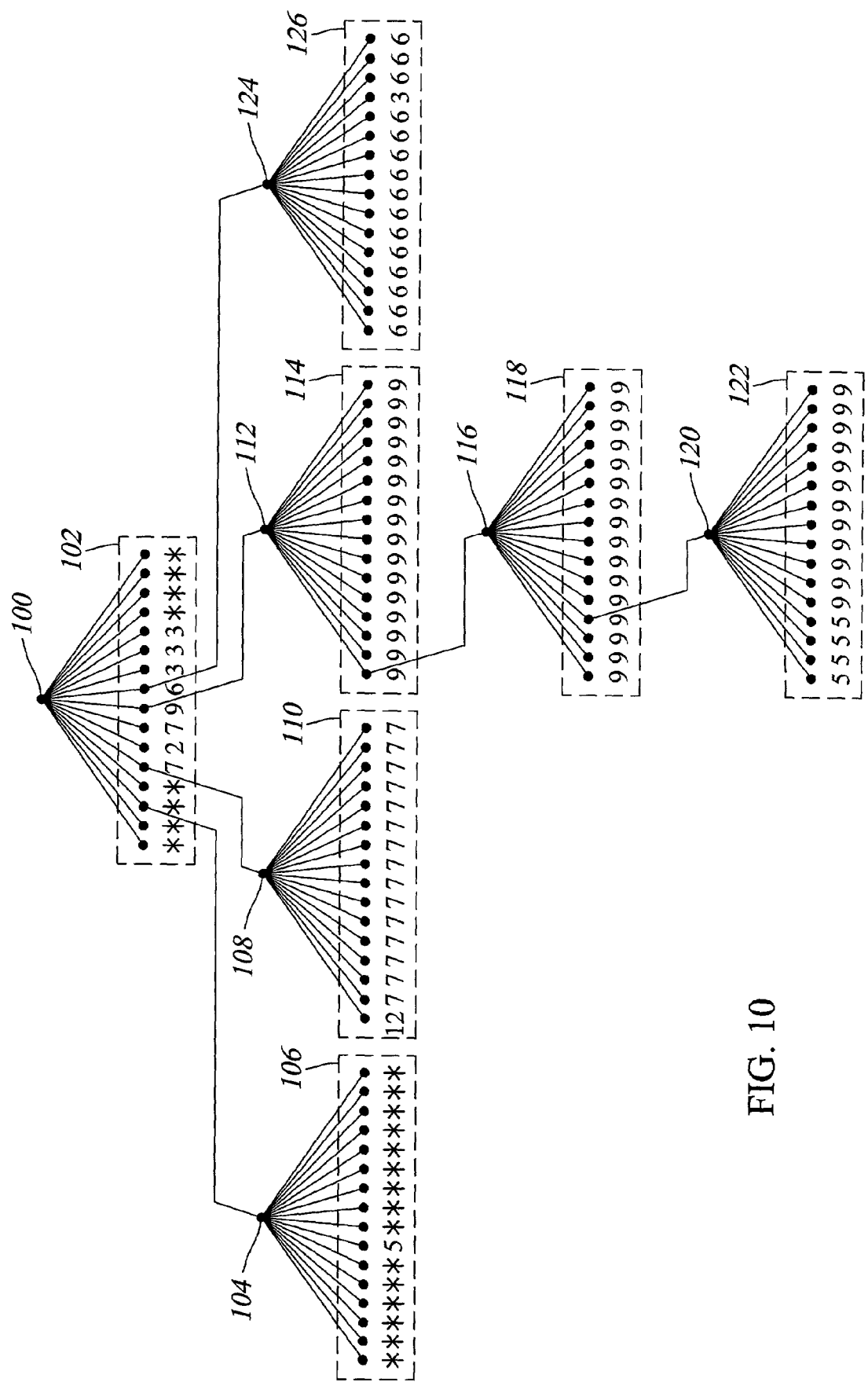
FIG. 10 is a trie data structure diagram in which a next hop address has been added to the trie data structure illustrated in FIG. 9.

The next entry from Table 3 to be added to the data structure is 10001100*. The next hop address corresponding to this entry is 3. FIG. 10 illustrates the data structure after adding this entry. The first four bits of the entry (1000) cause a new node 124 to be added to the eighth child of root node 100. Children 126 of node 124 inherit the next hop address of 6 from the parent of node 124. The next 4 bits of the entry (1100*) cause the next hop address associated with the twelfth child of node 124 to be changed from 6 to 3.

Figure 11:
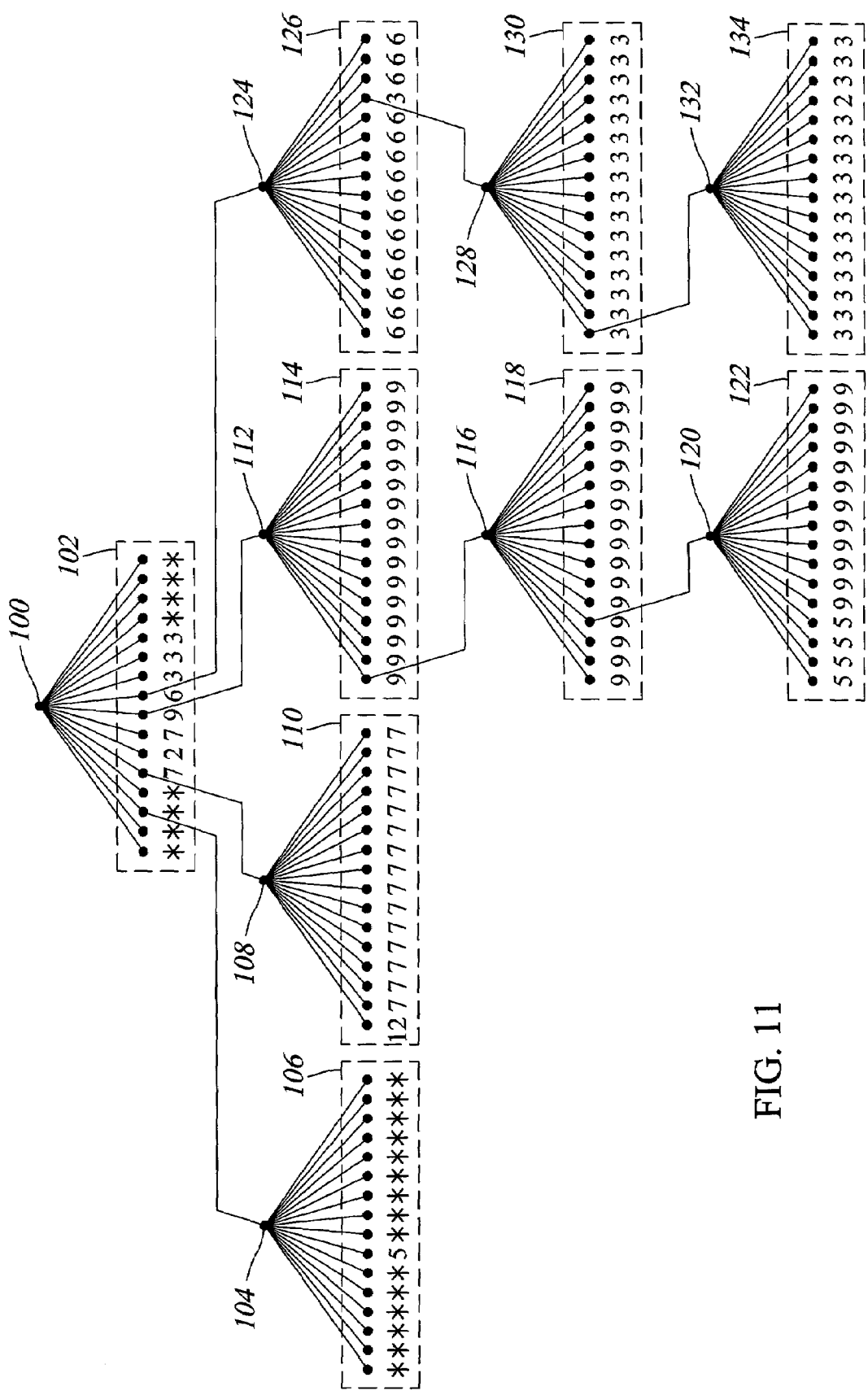
FIG. 11 is a trie data structure diagram in which a next hop address has been added to the trie data structure illustrated in FIG. 10.

The final entry from Table 3 to be added to the data structure is 1000110000001100*. The next hop address corresponding to this entry is 3. FIG. 11 illustrates the results of adding this entry to the data structure. The first 4 bits of the entry (1000) correspond to the eighth child of root node 100. However, because node 124 has already been added to the data structure, these bits do not change the data structure. The next 4 bits in the prefix (1100) point to the twelfth child of node 124. A new node 128 is added and the children 130 of node 128 inherit the next hop address of 3 from the parent of node 128. The next four bits in the entry (0000) point to the $0^{th}$ child of node 128. As a result of these bits, a node 132 is added. Children 134 of node 132 inherit the next hop address of 3 from the parent of node 132. The next 4 bits of the address (1100*) result in the next hop address associated with the twelfth child of node 132 being changed from 3 to 2.

Thus, FIG. 11 illustrates a trie data structure based on the entries in Table 3. As stated above, although the next hop addresses are shown in FIG. 11 and in the figures that led up to FIG. 11, according to an important aspect of the invention, these next hop addresses are omitted from the actual data structure stored in memory of a processor that performs the address lookups. The next hop addresses are shown adjacent to the leaf nodes in FIGS. 1–11 merely for illustration purposes to explain the process of constructing the data structure more clearly.

Figure 12:
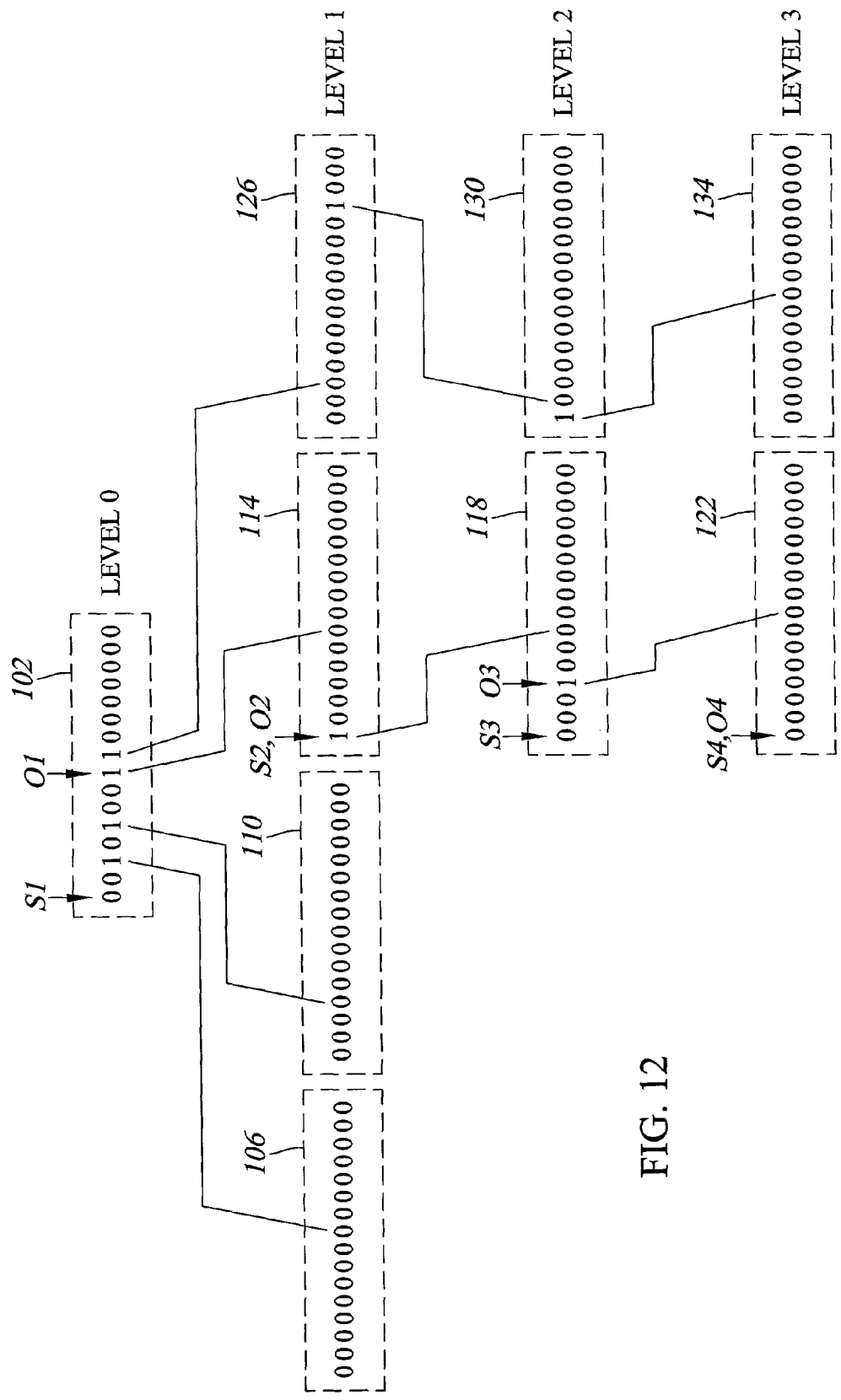
FIG. 12 illustrates a bit pattern for storing a forwarding table data structure in an on-chip memory according to an embodiment of the present invention.

Once the trie data structure has been constructed, a bit pattern to be stored in an on-chip memory can be constructed from the trie data structure by performing a breadth first traversal of the trie data structure. For example, in the data structure illustrated in FIG. 11, a node with children may be represented in the on-chip memory by a 1 and a node without children may be represented by a 0. Thus, the bit pattern representing children 102 of root node 100 may be represented by the bit pattern 0010100110000000. Bit patterns may be generated for the remaining children illustrated in FIG. 11. No additional information, such as pointers or next hop addresses, is required to be stored for each node. As a result, a forwarding table data structure according to the present invention is smaller than conventional forwarding table data structures and therefore more likely to fit in an on-chip memory FIG. 12 illustrates an exemplary bit pattern that may be stored in on-chip memory for the trie data structure according to an embodiment of the present invention. The reference numerals illustrated in FIG. 12 respond to the reference numerals of the children or leaf nodes illustrated in FIG. 11. It can be seen from FIG. 12 that neither pointer nor next hop address information is stored with each leaf node. Each node can be represented by a single bit in on-chip memory. As a result, a data structure according to an embodiment of the present invention is compact in size and will likely fit in an on-chip memory.

Figure 13:
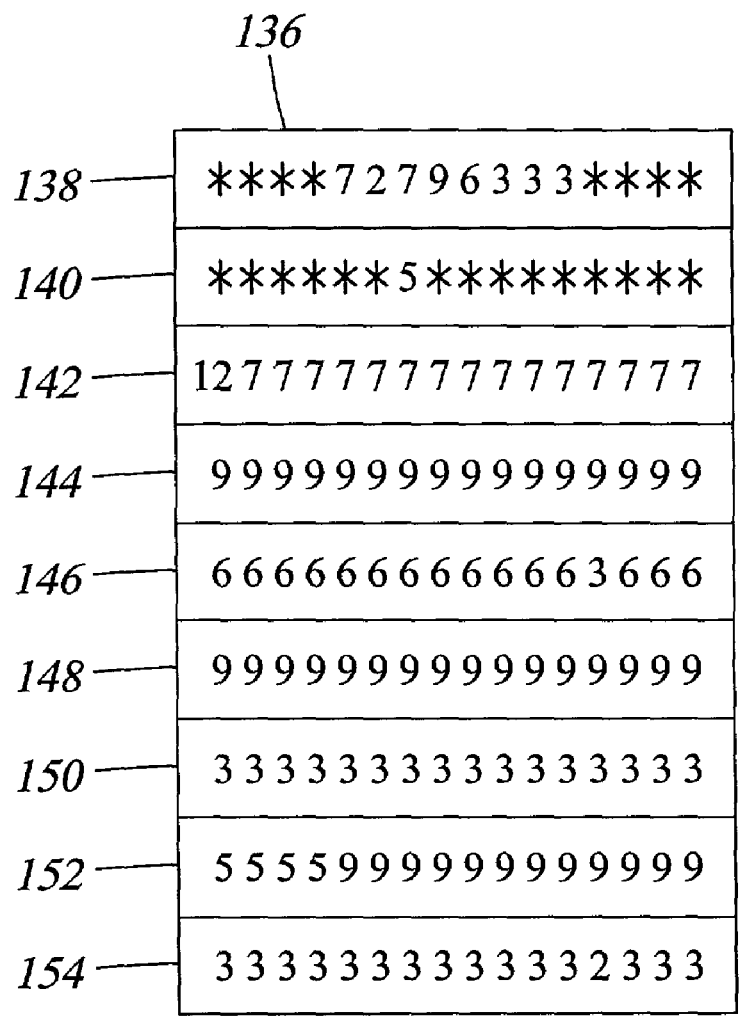
FIG. 13 is a memory diagram illustrating storage locations of next hop addresses in an off-chip memory device according to an embodiment of the present invention.

The next hop addresses may be stored in an off-chip memory device. FIG. 13 illustrates an exemplary method for storing the next hop addresses in an off-chip memory device. In FIG. 13, block 136 represents an off-chip memory device, such as a DRAM. Rows 138 through 154 in the memory device 136 each store a set of next hop addresses corresponding to children illustrated in FIG. 11. For example, row 0, indicated by reference numeral 138, stores the next hop addresses corresponding to children 102 of root node 100. Similarly, row 1, indicated by reference numeral 140, stores the next hop addresses of children 106 of node 104. Each of the remaining rows in memory device 136 stores a set of next hop addresses. The positions of the next hop addresses in each row of the data structure illustrated in FIG. 13 correspond to the positions of the corresponding children in the forwarding table data structure stored in the on-chip memory. For example, in FIG. 11, the next hop address of the fourth child of root node 100 is 7. Accordingly, in FIG. 12, 7 is stored in the fourth position of row 138 in the off-chip memory.

Searching the Data Structure

A network address lookup according to an embodiment of the present invention may be performed in two stages. The first stage involves an on-chip lookup where the longest path corresponding to the address in a received packet is determined from the bit pattern stored in the on-chip memory. The row and column address in the off-chip memory where the corresponding next hop address is stored is calculated from the data structure stored in the on-chip memory. In the second stage, a single off-chip lookup is performed based on the calculated address, and the next hop address is read. Only a single off-chip access is required in this embodiment, which reduces the network address lookup time over conventional lookup methods. The two stages can be pipelined to give a result every 60–65 nanoseconds, given current access times for DRAMs, which may be used for the off-chip memory. Such a scheme would result in over 15 million lookups per second. To improve speed even further, multiple DRAMS containing identical information can be used in parallel.

Figure 14:
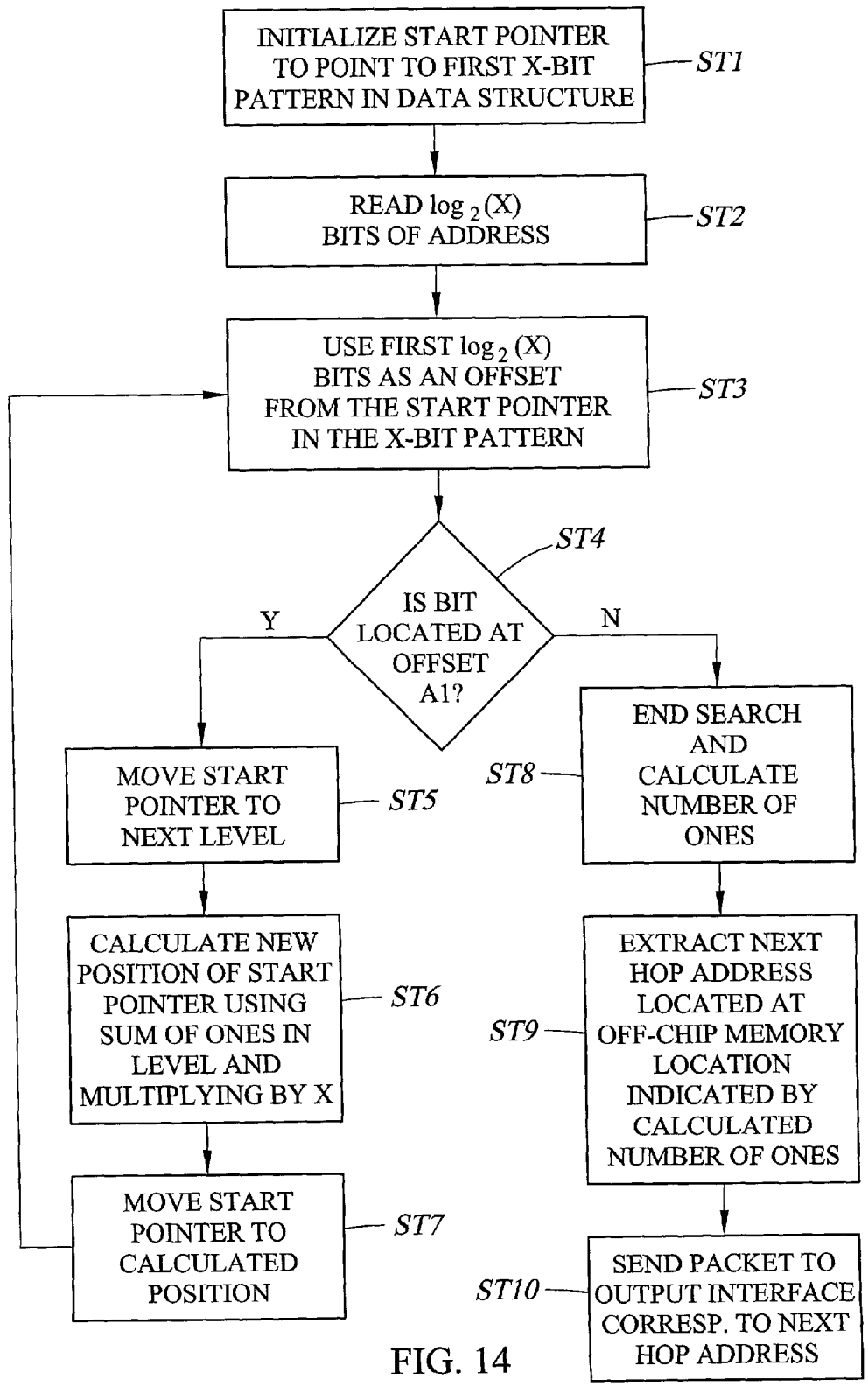
FIG. 14 is a flow chart illustrating exemplary steps for determining a next hop address in a trie data structure according to an embodiment of the present invention.

FIG. 14 illustrates exemplary steps in searching a data structure and determining a next hop address according to an embodiment of the present invention. Referring to FIG. 14, in step ST1, a start pointer is initialized to point to the first X-bit pattern in the data structure in the on-chip memory where X is the degree of the trie. For example, in the data structure illustrated in FIG. 11, the degree of the trie is 16. Accordingly, the start pointer would point to the first 16-bit pattern in the data structure. Next, in step ST2, the first $\log_2(X)$ bits of a destination address in a packet to be forwarded are read. In step ST3, the first $\log_2(X)$ bits are used as an offset from the start pointer in the X-bit pattern.

In step ST4, it is determined whether the bit located at the offset is a 0 or a 1. If the bit is a 1, in step ST5, the start pointer is moved to the next level. In step ST6, a new position is calculated for the start pointer using the sum of 1s in the current level and multiplying by X. In step ST7, the start pointer is moved to the calculated position. Steps ST2 through ST7 are repeated until the bit located at the offset becomes 0. In step ST8, if the step pointed to by the offset becomes a 0, the search is terminated and the total number of 1s up to and including the 1 that led to the final position of the offset is calculated. This number of 1s corresponds to the row in the off-chip memory that stores the next hop address. The final position of the offset in the forwarding table address lookup corresponds to the column in the off-chip memory that stores the next hop address. In step ST9, the next hop address located in the calculated off-chip memory location is extracted. In step ST10, the packet is sent to an output interface corresponding to the next hop address.

Figure 15A:
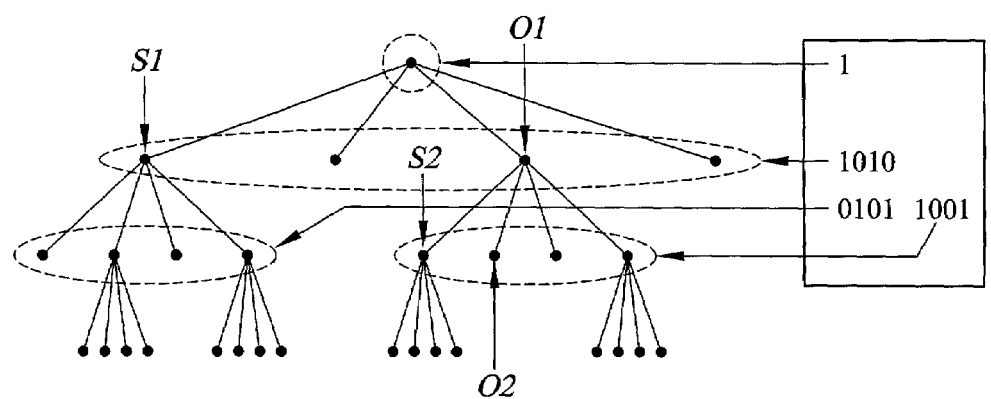
FIG. 15A is a data structure diagram illustrating a trie data structure storing next hop addresses.
Figure 15B:
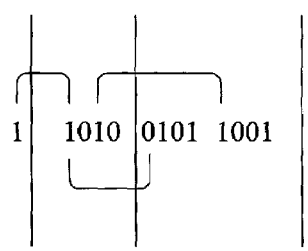
FIG. 15B is a bit pattern illustrating a location obtained in the data structure in FIG. 15A when performing an address lookup according to an embodiment of the present invention.

Two examples of searching a data structure using the steps illustrated in FIG. 14 will now be described. In the first example, a 4-way trie will be searched. In the second example, a 16-way trie will be searched. FIGS. 15A and 15B respectively illustrate an exemplary 4-way trie and a forwarding table bit pattern used to store the 4-way trie in on-chip memory according to an embodiment of the present invention. This data structure will be searched using an example input address of 1001110. Referring back to FIG. 14, in step ST1, a start pointer is initialized to point to the first X-bit pattern in the data structure, where X is the degree of the tree. Since the degree of the tree is four, the start pointer is initialized to point to the first 4-bit pattern in the data structure or 1010. The initial 1, corresponding to the root node can be ignored. FIG. 16 illustrates the first position S1 of the start pointer after execution of step ST1 illustrated in FIG. 14. In step ST2, the first $\log_2(4)$ bits of the address are read. Since $\log_2(4)=2$, the first 2 bits (10) of the address are read. In step ST3, the first $\log_2 X$ bits are used as an offset from the start pointer in the X-bit pattern. In this example, the offset is 2. Accordingly, the offset is located 2 bits from the start pointer. FIG. 17 illustrates the first positions S1 and O1 of the start pointer and the offset after execution of step ST3 in FIG. 14.

In step ST4, it is determined whether the bit located at the offset is a 1. In the example illustrated in FIG. 17, the bit located at the position O1 of the offset is a 1. Accordingly, in step ST5, the start pointer is moved to the next level. The new position of the start pointer in the next level is calculated using the sum of 1s in the previous level before the position of the offset in the next level are skipped then multiplying by X. Since there is one 1 in the first level before position 01, the first 1×4=4 bits in the next level are skipped. FIG. 18 illustrates the position of S2 the start pointer after execution of steps ST5–ST7 in FIG. 14.

Control then returns to step ST2, where the next 2 bits of the address or 01 are read. Step ST3 is then executed and the offset is moved 1 bit from the current position of the start pointer. FIG. 19 illustrates the positions S2 and O2 of the start pointer and the offset after execution of step ST3. From FIG. 19, it can be seen that the bit pointed to by the offset is a 0. Accordingly, control proceeds to step ST8 where the search is terminated and the number of 1s is calculated. The number of 1s is equal to the total number of 1s in the data structure or bit pattern before the current position of the offset, including the 1 that led the current 0. As illustrated in FIG. 15A, the total number of 1s before and including position O1 is 2. Thus, the off-chip memory row is 2, where the row numbers start from 0. The column in the off-chip memory is determined by the position O2. O2 is located in the first position (starting from zero) from the start of the bit pattern, in the forwarding table data structure. Accordingly, the next hop address may be extracted from row 3, column 1 in the off-chip memory An example of a search will now be described using the data structures constructed in FIGS. 1–13. FIG. 20 illustrates an exemplary arrangement of the data structure illustrated in FIG. 12 in on-chip memory. In FIG. 20, the bits of the data structure are represented in hexadecimal format. Each row in FIG. 20 represents a row in the on-chip memory. Each row also stores a sum value indicating the sum of is in the current level from previous rows. In this example, since the bit pattern of each level fits into a single row, all of the sum bits are 0. However, the present invention may be implemented using larger data structures in which levels span more than one row. In such an example, the sum value would indicate the number 1s in previous rows corresponding to a given level.

The off-chip memory data structure for this example is illustrated in FIG. 13. In order to illustrate the functionality of locating a next hop address, an exemplary input address of 112.48.32.248 will be used. The corresponding binary representation of this address is 0111 0000 0011 0000 0010 0000 1111 1000. The first 4 bits of the input address (0111) lead to bit 7 (starting from bit 0) in the bit pattern for level 0 of the data structure. As illustrated in FIG. 12, this bit is a 1. Since the bit pointed to by the offset is a 1, the start pointer is moved to the next level. The position of the start pointer in the next level is calculated using the sum of 1s in level 0 before the current position of the offset and multiplying by 16, the degree of the tree. As illustrated in FIG. 12, it can be seen that there are two 1s in level 0 before bit 7.

Accordingly, the new position S2 for the starter pointer is located at 2×16=bit 32 in level 1.

The next 4 bits of the input address are 0000. Accordingly, the position O2 of the offset corresponds to the position S2 of the starter pointer. Since this bit is set to a 1, starter pointer is moved to the next level. Since there are no 1s before the present 1 in level 1, the new value of the starter pointer is the first 0 in level 2. This position is indicated by S3 in FIG. 12. The next 4 bits of the input address are 0011. Accordingly, the new position for the offset O3 is the third bit in level 2 of the data structure. Since the value pointed to by the current position of the offset is a 1, the start pointer moves to level 3. Since there are no 1s before O3 in level 2, no bits need to be skipped in level 3. Accordingly, the location S4 of the start pointer corresponds to the $0^{th}$ bit in FIG. 4. The next 4 bits in the input address are 0000. The offset is thus 0, and the position O4 of the offset in level 4 corresponds to the position S4 of the starter. Thus, the search ends. The total number of 1s up to and including the 1 located at position O3 is 7. Since the total number of 1s is 7, the next hop address is located in row 7 of the off-chip memory. Since the final position O4 of the offset is position 0, the next hop address is located at column 0 in row 7 of the off-chip memory. Referring to FIG. 13, the next hop address located at position 0 in row 8 is 5. Because the present invention allows the exact position of the next hop address to be determined based on the location obtained in the on-chip memory, only a single off-chip memory access is required to obtain the next hop address. As a result, lookup times are faster and more likely to be constant.

Insertion and Deletions of Entries From On-Chip Data Structure

Any insertion or deletion of an entry results in a different pattern in on-chip memory. Thus, updating an entry requires reconstruction of the trie data structure. However, in most practical implementations, updates to a routing table do no occur as frequently as searches. In addition, multiple updates can be batched to improve efficiency.

Exemplary Hardware Implementation

Figure 21:
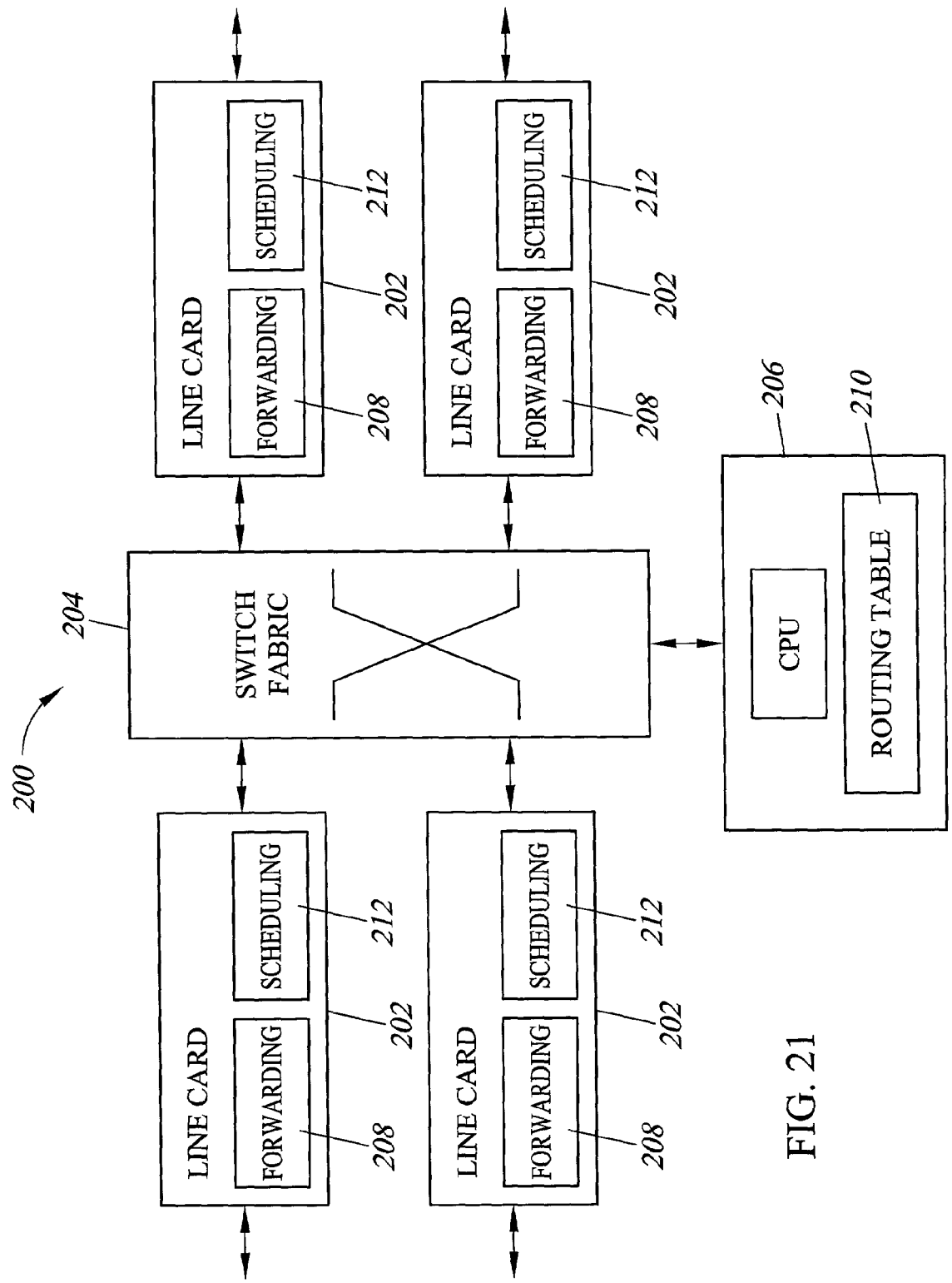
FIG. 21 is a block diagram illustrating a router in which the methods and systems for fast packet forwarding according to embodiments of the present invention may be practiced.

FIG. 21 is a block diagram illustrating a router including forwarding engines in which the methods and data structures according to the present invention may be implemented. In FIG. 21, router 200 includes line cards 202, a switch fabric 204, and a processing unit 206. Each line card 202 includes a forwarding table 208 copied from a routing table 210. Each line card 202 also includes a scheduler 212 that schedules and configures switch fabric 204. Each line card includes its own processor for performing the forwarding and scheduling operations.

In operation, when a packet is received by one of the line cards 202 of router 200, a lookup is performed in a forwarding table 208 to determine the address of the output port identifier corresponding to the next hop address. Once the output port identifier is determined, the packet is forwarded through the switch fabric to the line card associated with the appropriate output port.

The data structures and address lookup algorithms according to the present invention may be performed on a line card or alternatively on a centralized processor that performs routing lookups. Because performing lookups on the line cards increases lookup speed, the data structures and lookup methods according to the present invention are preferably implemented on line cards.

Figure 22:
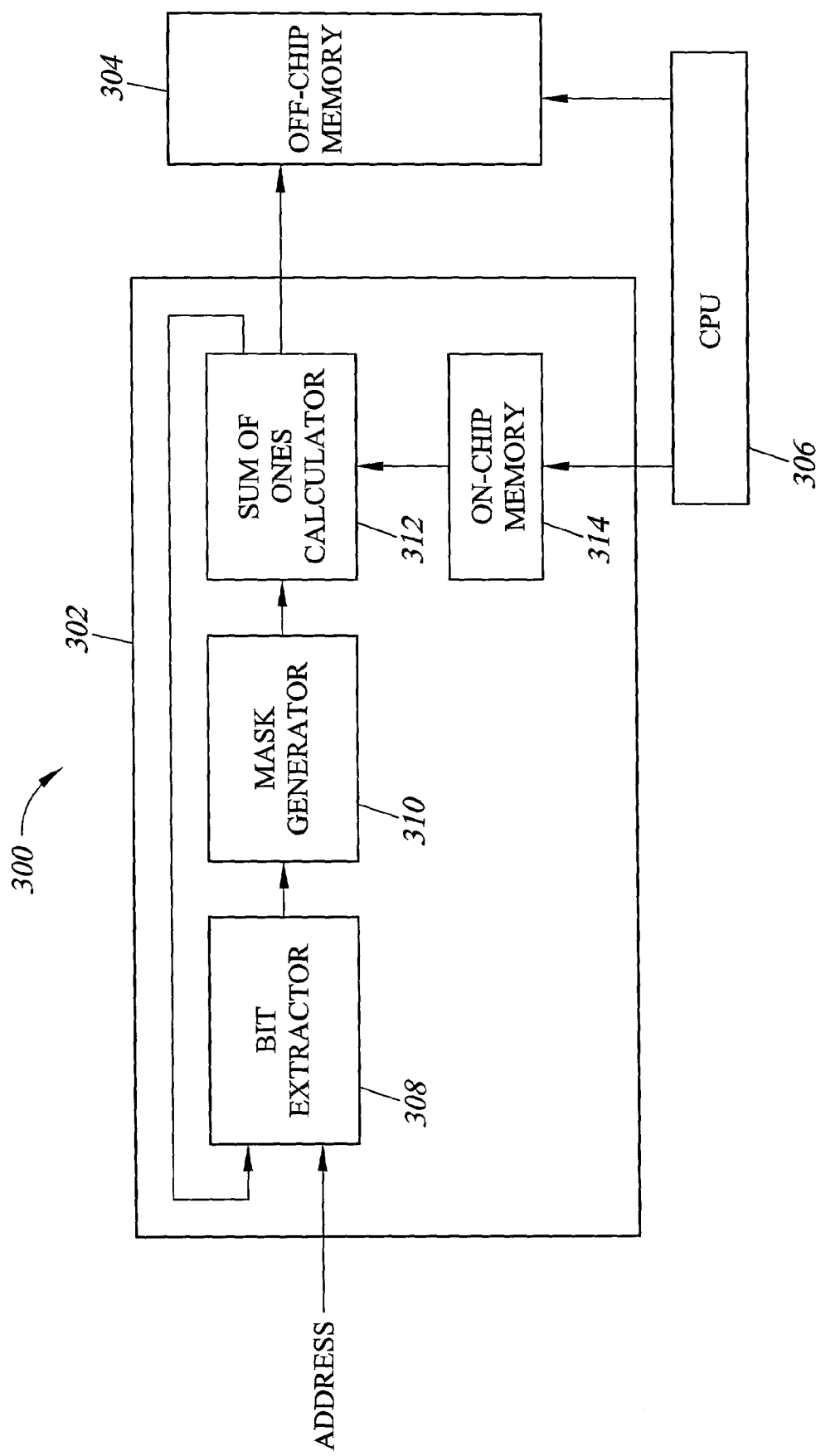
FIG. 22 is a block diagram of a fast packet forwarding engine according to an embodiment of the present invention.

FIG. 22 illustrates an exemplary forwarding engine that may be implemented on a line card according to an embodiment of the present invention. In FIG. 22, forwarding engine 300 includes an ASIC 302 for storing and performing the lookup in the trie data structure, an off-chip memory 304 for storing the next-hop addresses, and a CPU 306 for updating routing and forwarding tables. ASIC 302 includes a bit extractor 308, a mask generator 310, a sum of Is calculator 312, and an on-chip memory device 314. Bit extractor 308 extracts bits from an input address. Mask generator 310 generates a mask used to compute the sum of 1s up until a current bit position. Sum of 1s generator 312 calculates the current sum of 1s and feeds this information back to bit extractor 308 in order to calculate the position of the offset. On-chip memory 314 stores the trie data structure.

In the 16-way trie example discussed above, the input address is processed in units of 4 bits. Accordingly, bit extractor 308 extracts bits from the input address in 4-bit segments. Bit extractor 308 outputs this information along with the offset to mask generator 310. Mask generator 310 generates a mask that is used to compute the sum of 1s. Sum of 1s calculator 312 receives the mask in the current on-chip memory row to determine the next offset. Once traversal in the on-chip memory is complete ASIC 302 generates a read request to off-chip memory 304 using the calculated value. In one off-chip access time, the next hop address is available.

Figure 23:
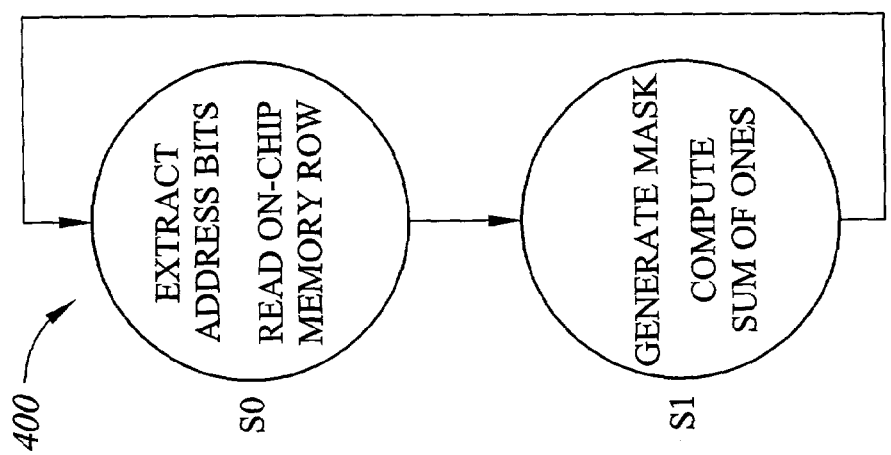
FIG. 23 is a state diagram illustrating exemplary states in determining a next hop address based on a location obtained in a data structure according to an embodiment of the present invention.

In one example, the on-chip memory traversal may be implemented as a finite state machine (FSM). FIG. 23 is a state diagram illustrating exemplary states for traversing the on-chip data structure according to an embodiment of the present invention. In the illustrated example, finite state machine 400 includes two states, S0 and S1. In state S0, forwarding engine 300 extracts address bits and reads the current on-chip memory row. The state machine then transitions to state S1 where the state machine generates the mask and computes the sum of 1s. In one exemplary implementation that will be described below, each state takes eight nanoseconds to complete. As a result, traversal of each level in the on-chip memory can occur in as little as 16 nanoseconds.

Figure 24:
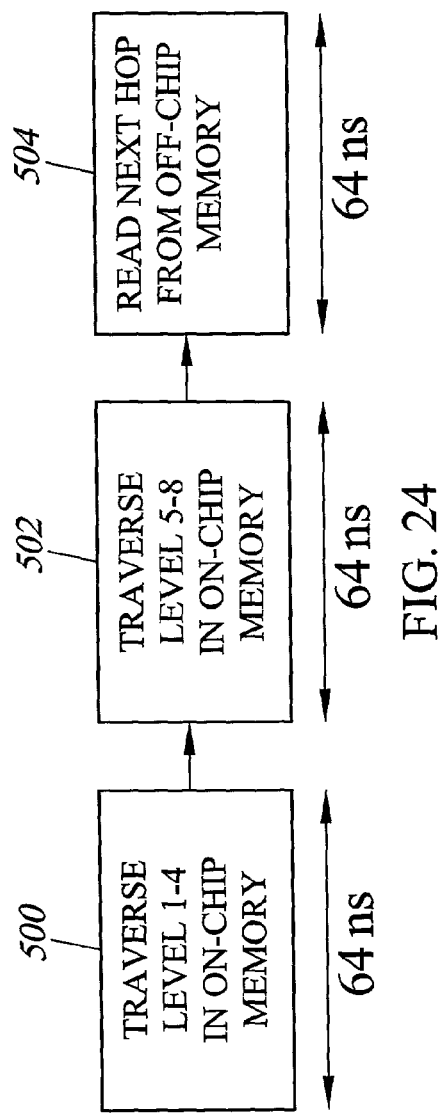
FIG. 24 is a flow chart illustrating exemplary steps and worst-case time estimates for determining a next hop address according to an embodiment of the present invention.

If the addresses being looked up are a 32-bit IPv4 addresses, there are eight levels of storage in the on-chip memory. Accordingly, it would take 128 nanoseconds to traverse the on-chip memory. The state machine illustrated in FIG. 23 can be unrolled and pipelined to increase throughput. FIG. 24 illustrates a pipelined example of implementing a fast address lookup according to an embodiment of the present invention. In FIG. 24, block 500 represents the traversal of levels 1–4 in an on-chip memory, such as on SRAM. Block 502 represents the traversal of levels 5–8 in the on-chip memory. Finally, block 504 represents the off-chip memory lookup. As illustrated in FIG. 24, the total lookup time is 192 nanoseconds. The lookup times in blocks 500 and 502 match the lookup in off-chip memory indicated by block 504.

The most important block used in the design of a forwarding engine according to an embodiment of the present invention is blocks that generate the mask and calculate the sum 1s. An exemplary designed for these blocks will now be described in detail.

Generating the Mask

To compute the sum of 1s until a certain bit position, a mask must be generated to remove unwanted bits from the row in the on-chip memory. For example, in row 0 of the on-chip memory structure illustrated in FIG. 12, the sum of 1s up to bit 7 was required to be calculated. Bits following bit 7 are unwanted. Accordingly, the corresponding mask required to be generated to remove the unwanted bits is 1111 1110 0000 0000. This mask may be bitwise ANDed with the on-chip memory row to give (1111 1110 0000 0000) AND (0010 1001 1000 0000)=(0010 1000 0000 0000). The result obtained after bitwise ANDing with the on-chip memory row is input to sum of 1s calculator 312 to calculate the sum of 1s.

Figure 25:
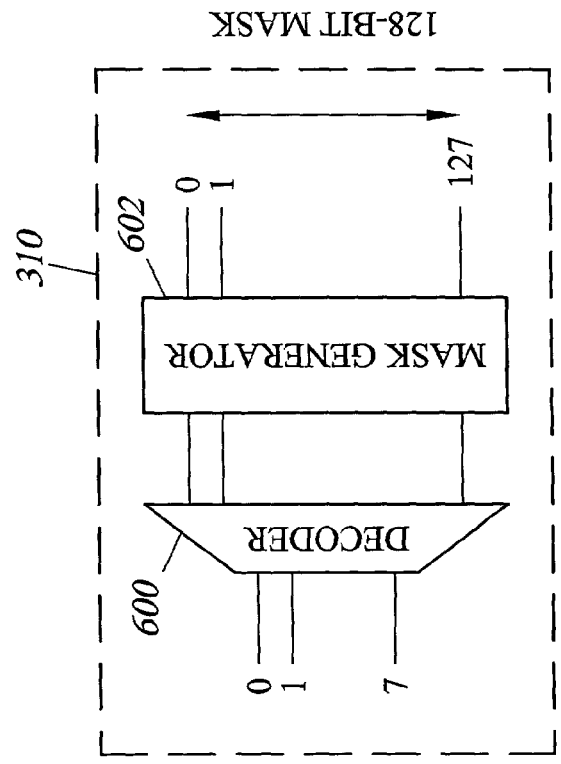
FIG. 25 is a block diagram of mask generation module 312 illustrated in FIG. 22.

FIG. 25 illustrates an exemplary hardware implementation of mask generator 310 illustrated in FIG. 22. In FIG. 25, mask generator 310 includes a decoder 600 and a mask generator circuit 602. Decoder 600 decodes the bit position of the offset. Depending on the bit position, one of the outputs of decoder 600 is set. The output of the decoder is input to mask generator circuit 602, which generates the bit pattern for the mask. For example, if the offset is located at bit 7 in an on-chip memory row, the seventh output of decoder 600 would be set and mask generator circuit 602 would generate a mask of 1111 1110 0000 0000.

Figure 26:
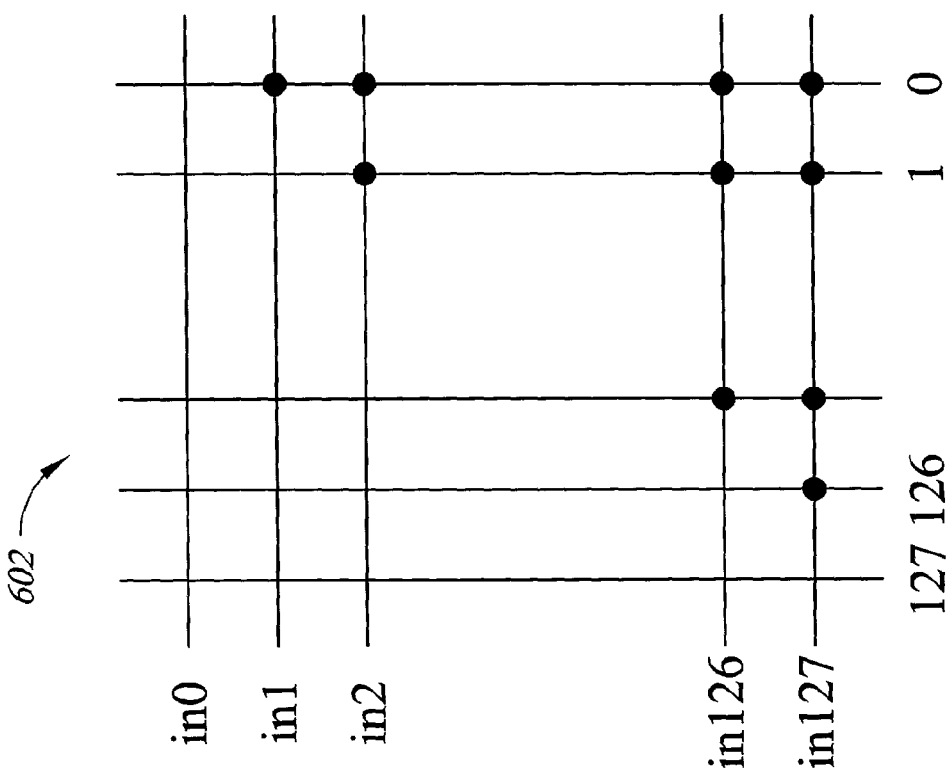
FIG. 26 is a circuit diagram of mask generator 602 illustrated in FIG. 25.

FIG. 26 is an exemplary internal block diagram of mask generator circuit 602 illustrated in FIG. 25. Inputs in0–in127 are connected to decoder 600. Outputs 0–127 output a 128-bit mask. Inputs in0–in127 are connected to outputs 0–127 to generate a mask corresponding to the bit position. For example, if bit 126 is the current position of the offset, all output lines including and lower than 126 will be high and output line 127 will be low.

The delay through the mask generator 602 is the maximum delay at line 127 with a fan-out of 128. In the example illustrated in FIG. 25, decoder 600 comprises an 8:128 bit decoder. Using current hardware, this decoder takes around 0.7 nanoseconds to decode. Mask generator takes about 0.6 nanoseconds to generate the appropriate mask.

Computing the Sum of 1s

Figure 27:
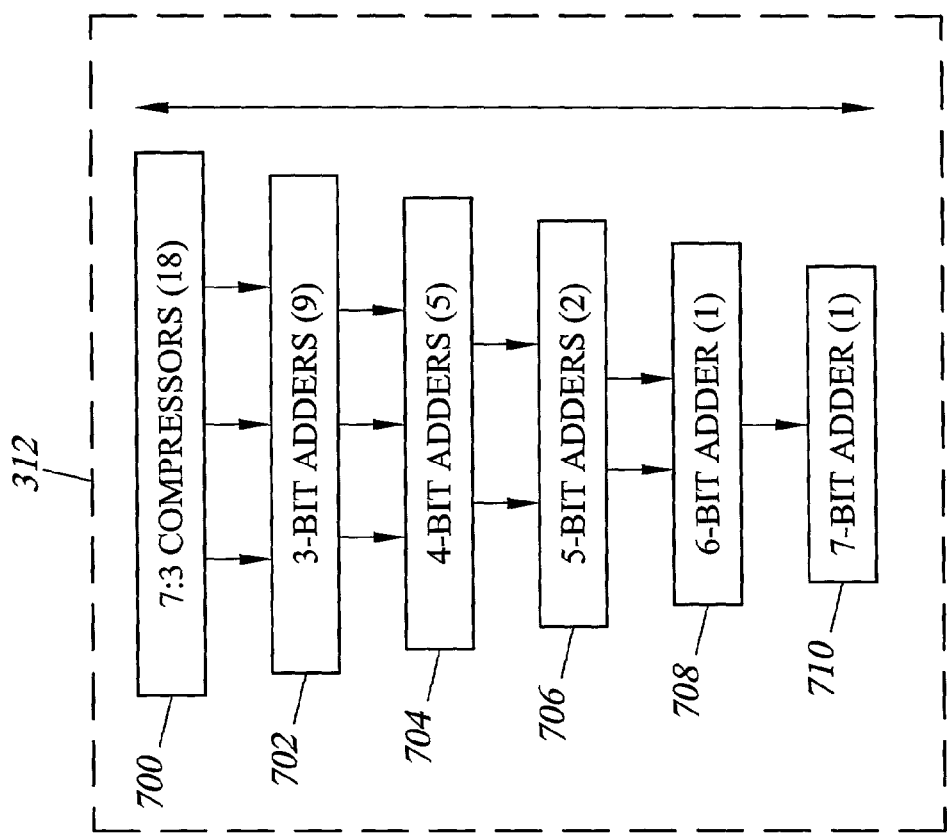
FIG. 27 is a block diagram illustrating sum of 1s generator 314 illustrated in FIG. 25.

Computing the sum of 1s according to embodiments of the present invention can be performed in any number of ways. One simple way is to use a bank of adders. FIG. 27 illustrates an exemplary adder bank that may be used to compute the sum of 1s for a 128-bit wide on-chip memory row. In FIG. 27, sum of 1s calculator 312 includes eighteen 7:3 compressors 700, nine 3-bit adders 702, five 4-bit adders 704, two 5-bit adders 706, one 6-bit adder 708, and one 7-bit adder 710. 7:3 compressor 700 can be thought of as a counter that counts up the number of 1s in the input. A 128-bit input requires 18 of these compressors. The eighteen 3-bit results obtained after this stage can be added in the next stage using nine 3-bit adders 702 as illustrated in FIG. 27. The output of 3-bit adder 702 is nine 4-bit results. This process is repeated using adders 704–710 until an 8-bit result is output. The total number of adder stages illustrated in FIG. 27 is thus 6. For a $0.18\mu$ technology, a 32-bit adder requires about 0.6 nanoseconds to add. Assuming a similar budget for the smaller adders, which take less time to add, the worst-case time estimate required to compute the sum would be less than 4 nanoseconds. In all, the total time to compute the sum of 1s is well under the budget time of 8 nanoseconds for each state illustrated in FIG. 23.

Performance Analysis

The fast-lookup algorithm was executed on Internet routing tables from "Michigan University and Merit Network. Internet Performance Management and Analysis (IPMA) Project." (http://nic.merit.edu/ipma). The results have been summarized in Table 4, which shows the amount of memory required for these routing tables.

TABLE 4

Memory Requirements for Various Routing Tables

| Site | No of Entries | SRAM (kB) | DRAM (MB) | Trie Memory (MB) | Bytes/entry |
|---|---|---|---|---|---|
| MaeEast | 23,113 | 24.4 | 11.43 | 24.28 | 1.08 |
| MaeWest | 35,752 | 34.75 | 16.32 | 34.683 | 1.99 |
| PacBell | 42,655 | 37.62 | 17.67 | 37.54 | 0.9 |
| Paix | 17,641 | 20.5 | 9.63 | 20.46 | 1.19 |
| AADS | 31,958 | 32.25 | 15.15 | 32.18 | 1.03 |

For instance, the MaeEast routing table with over 23,000 entries takes around 25 kB of SRAM to store the bit pattern and around 12 MB of DRAM to store the next hop addresses. In a conventional trie implementation, around 25 MB of DRAM memory (the second last entry in the table) would be required. The last entry in the table shows the amount of compaction that can be achieved in the on-chip SRAM. For all of the routing tables, approximately one byte of SRAM memory per entry was required. This gives very good scalability, which is important as routing table sizes increase.

Compaction

The overall compaction of the forwarding table achieved is much higher than conventional schemes. The required SRAM is sufficiently small (500×to smaller than the DRAM memory) to fit on a single chip, given current fabrication technology. This compaction is advantageous, especially for IPv6, which may require larger routing tables or multiple tables for different hierarchies. As stated above, according to the present invention, the data is compacted to around 1 byte for every entry in the forwarding table. In comparison, the forwarding table described in Degermark et al., M. Degermark A. Brodnik, S. Carlson, and S. Pink, "Small Forwarding Tables for Fast Routing Lookups," in *Proc. ACM SIGCOMM*, vol. 27, pp. 3–14, October 1997, uses 5–6 bytes per entry. The implementation described in Huang et al., N.-F. Huang and S.-M. Zhao, "A Novel IP-Routing Lookup Scheme and Hardware Architecture for Multigigabit Switching Routers," *IEEE Journal on Selected Areas in Communications*, vol. 17, pp. 1093–1104, June 1999, has an even larger forwarding table. Also, the overall memory consumption (SRAM and DRAM) using this scheme is almost half of that required in conventional implementations. The static instruction count for building the tree is 170 and the total CPU time taken to build the SRAM data and the DRAM data is on the order of 100 ms on a SUN Ultra 5 with a 333 MHz processor. Since most forwarding tables need to be updated only about once every second, building the entire database from scratch is not an issue.

The number of memory accesses in the exemplary implementation described herein is 8 SRAM accesses and 1 DRAM access. The number of SRAM accesses can be reduced further by splitting the SRAM and performing a direct lookup on the first 16 bits. The number of accesses would then be 5 SRAM accesses and 1 DRAM access. By implementing queues and multiple DRAMs in parallel, a much higher throughput can be obtained. In the exemplary implementation described herein a lookup can be done every 64 ns which gives over 15 million lookups per second. In a conventional implementation, the number of memory accesses that would be required is 8 DRAM accesses, and DRAM accesses are quite expensive. For example, according to "128 MB DDR SDRAM Datasheet" (http://www.micronicom/products/datasheetsl ddrsdramds.html), DRAM access costs are 60 ns per random read/write. Thus, conventional implementations that require multiple DRAM accesses are much slower than the present invention.

The amount of memory used in embodiments of the present invention is more than the 3–4 MB of Patricia and basic binary schemes as described in B. Lampson and G. V. V. Srinivasan, "IP Lookups using Multiway and Multicolumn Search," in Proc. *IEEE INFOCOM'98*, vol. 3, (San Francisco, Calif.), pp. 1248–1256, 1998. This increased memory usage is because some embodiments of the present invention use a 16-way trie in order to reduce the depth of the trie, and trie completion takes up extra memory. One advantage of using a 16-way trie, in addition to the reduction in depth, is that a smaller SRAM memory is required. There is more redundancy in the DRAM data as seen in FIG. 13; however, using extra off-chip DRAM memory in order to reduce DRAM accesses is a better alternative.

A wider SRAM, such as a 512 or 1024 bit-wide SRAM, can be used in the design. This would not change the performance of the system but would reduce the memory overhead used in the forwarding engine. In the current implementation, 20 bits are used to hold the sum of 1s value for every 128 bits of data in the SRAM row. The memory overhead in the design is an additional 15–16%. By utilizing 512-bit-wide SRAM, the memory overhead can be reduced to less than 4%. The number of memory accesses would remain the same. Using a wider SRAM in the design would require additional hardware to compute the sum of 1's, though the timing constraints would still be met using current technology.

CONCLUSIONS

An address lookup scheme that is easy to implement in hardware is described. The present invention limits time-intensive off-chip DRAM accesses. In one implementation, only 1 DRAM access per lookup is required. This is achieved by having a small on-chip SRAM, which contains additional path-related information. The amount of SRAM required is quite small and a compaction of around 500 times the DRAM memory can be achieved. On practical routing tables, 1 byte of SRAM memory is required per entry in the table. The operation of the SRAM and DRAM is pipelined such that a lookup can be done every 64 ns, resulting in a lookup rate of over 15 million lookups per second.

Delay Calculations and Assumptions

To determine the delays discussed above for the mask generator circuit, the maximum load ($C_L$) on an input is $128*C_{in}$, where $C_{in}$ is the input capacitance of a receiver. A multiple stage buffer with each stage being larger than the previous stage by a factor (u) is required to drive the load. The number of stages in the buffer is N, where $$C_L = xC_{in} = u^n C_{in}$$

It can be shown that the optimum stage ratio is equal to e (2.7182). (J. M. Rabaey, Digital Integrated Circuits: *A Design Perspective*, ch. 8, Prentice-Hall Inc., 1996). Taking the stage ratio to be 3 in the design of the buffer, the total delay given by $$T_p = N*u*t_p 0$$

where $t_{p0}$ is the delay across the minimum size transistor. $t_{p0}$ is approximately 40 ps in 0.25μ CMOS technology, making the total delay for the mask generator to be 0.6 ns.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for determining an output port corresponding to the next node to which a packet is to be directed in a computer network, the method comprising:
   (a) constructing a data structure based on a plurality of variable-length network address prefixes;
   (b) storing the data structure in a first memory device;
   (c) storing, in a second memory device, a set of output port identifiers corresponding to the network address prefixes;
   (d) traversing the data structure in the first memory device based on bits in an input address to determine a location in the data structure corresponding to the longest network address prefix that matches the input address; and
   (e) determining, based on the location in the data structure, an offset in the second memory device for the output port identifier corresponding to the input address.

2. The method of claim 1 wherein constructing a data structure includes constructing a trie data structure and storing a bit pattern indicative of the trie data structure in the first memory device.

3. The method of claim 2 wherein traversing the data structure comprises:
   (a) initializing a start pointer to point to a first X-bit pattern in the bit pattern stored in the first memory device, the first X-bit pattern corresponding to a first level in the trie data structure, X being an integer equal to the degree of the trie data structure;
   (b) reading the first $\log_2(X)$ bits of the input address and calculating an offset in the bit pattern stored in the first memory device based on the value of the first $\log_2(X)$ bits;
   (c) determining whether a bit pointed to by the offset has a first value or a second value;
   (d) in response to determining that the bit has a first value, incrementing the current level of the start pointer, calculating an offset based on a number of bits having the first value before the offset in the previous level of the trie data structure, advancing the start pointer to point to a new bit position in the current level based on the number of bits having the first value, and repeating steps (b)–(d) for each $\log_2(X)$ bits in the input address until step (c) results in the offset pointing to a bit having the second value; and
   (e) in response to determining that the bit pointed to by the offset has the second value, calculating the total number of bits having the first value up to and including the bit that led to the current position of the offset, wherein the total number of bits having the first value calculated corresponds to the offset in the second memory device for extracting the output port identifier.

4. The method of claim 2 wherein storing the data structure in a first memory device includes storing a single bit for each node in the trie data structure in the first memory device.

5. The method of claim 2 wherein storing the data structure in a first memory device includes omitting next-hop address pointer information from the first memory device.

6. The method of claim 1 wherein the data structure comprises a trie structure in which bits of a first value represent nodes having children and bits of a second value represent nodes having no children and wherein determining an offset in the second memory device based on the location obtained in step (d) comprises:
 (a) counting the number of bits having the first value before the location; and
 (b) calculating an offset in the second memory device corresponding to the output port identifier based on the number of bits having the first value.

7. The method of claim 1 wherein the first memory device has a shorter access time than the second memory device.

8. A method for determining an output port identifier corresponding to a network address of the next node to which a packet is to be routed, the method comprising:
 (a) traversing a trie data structure based on bits in an input network address and determining a location in the data structure based on the bits in the input network address;
 (b) maintaining a count of a number of bits having a first value up to and including the location;
 (c) determining, based on the number of bits having the first value, an offset for extracting an output port identifier from a memory device; and
 (d) extracting the output port identifier using the offset.

9. The method of claim 8 wherein traversing a tile data structure based on bits in an input network address includes traversing a bit pattern stored in a first memory device and wherein extracting the output port identifier comprises extracting the output port identifier from a second memory device of lower speed than the first memory device.

10. The method of claim 8 wherein determining a location in the trie data structure includes locating an offset with no children in the trie data based on all of the bits in the input network address.

11. The method of claim 8 wherein steps (a)–(d) are implemented in hardware.

12. The method of claim 8 wherein steps (a)–(d) are implemented in software.

13. The method of claim 8 wherein steps (a)–(d) are implemented in a combination of hardware and software.

14. A fast packet forwarding engine for performing fast lookups for output port identifiers corresponding to network addresses, the fast packet forwarding engine comprising:
 (a) a first memory device storing a trie data structure corresponding to a plurality of variable-length network address prefixes, the trie data structure including a plurality of leaf nodes at locations corresponding to variable-length network address prefixes;
 (b) a second memory device storing a plurality of output port identifiers; and
 (c) a processor for determining the location of a leaf node in the trie data structure in the first memory device based on bits in an input address, and for determining an offset for extracting an output port identifier from the second memory device based on the location.

15. The fast packet forwarding engine of claim 14 wherein the trie data structure includes leaf nodes, and pointer information is not stored at the leaf nodes.

16. The fast packet forwarding engine of claim 14 wherein the first memory device has a shorter access time than the second memory device.

17. The fast packet forwarding engine of claim 14 wherein the first memory device stores a bit pattern indicative of the trie data structure, wherein each node in the trie data structure is represented by a single bit in the bit pattern.

18. The first packet forwarding engine of claim 14 wherein the first memory device and the processor are located on a first chip.

19. The first packet forwarding engine of claim 18 wherein the second memory device is located on a second chip separate from the first chip.

20. The fast packet forwarding engine of claim 14 wherein the processor comprises:
 (a) a bit extractor for extracting bits from the input address;
 (b) a mask generator for masking bits generating a mask used to calculate a sum of bits having a first value corresponding to the offset in the second memory device; and
 (c) an offset calculator for summing the number of bits having the first value using the mask and the bits extracted from the input address, wherein the offset corresponds to the sum.

* * * * *